US009723080B2

(12) United States Patent
Shibayama et al.

(10) Patent No.: US 9,723,080 B2
(45) Date of Patent: *Aug. 1, 2017

(54) STORAGE MANAGEMENT COMPUTER AND METHOD FOR AVOIDING CONFLICT BY ADJUSTING THE TASK STARTING TIME AND SWITCHING THE ORDER OF TASK EXECUTION

(71) Applicant: Hitachi, Ltd., Tokyo (JP)

(72) Inventors: Tsukasa Shibayama, Kawasaki (JP); Yukinori Sakashita, Sagamihara (JP); Masayasu Asano, Yokohama (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/639,295

(22) Filed: Mar. 5, 2015

(65) Prior Publication Data

US 2015/0180975 A1 Jun. 25, 2015

Related U.S. Application Data

(63) Continuation of application No. 12/999,176, filed as application No. PCT/JP2010/068493 on Oct. 20, 2010, now Pat. No. 9,003,414.

(30) Foreign Application Priority Data

Oct. 8, 2010 (JP) ................................ 2010-228076

(51) Int. Cl.
*H04L 29/08* (2006.01)
*G06F 11/34* (2006.01)
(Continued)

(52) U.S. Cl.
CPC ...... *H04L 67/1097* (2013.01); *G06F 11/3419* (2013.01); *G06F 11/3447* (2013.01);
(Continued)

(58) Field of Classification Search
None
See application file for complete search history.

(56) References Cited

U.S. PATENT DOCUMENTS 6,732,080 B1    5/2004  Blants
7,451,447 B1 *  11/2008 Deshpande ........... G06F 9/4812
                                                  718/102
(Continued)

FOREIGN PATENT DOCUMENTS

JP    2004-171163    6/2004
JP    2008-203937 A  9/2008
JP    2010-183372    8/2010

OTHER PUBLICATIONS

International Search Report cited in related International Patent Application No. PCT/JP2010/068493, issued Dec. 7, 2010.
(Continued)

*Primary Examiner* — Abu Ghaffari
(74) *Attorney, Agent, or Firm* — Foley & Lardner LLP

(57) ABSTRACT

A storage apparatus includes a storage unit for storing data read/written by a host computer and provides the host computer with a storage area of the storage unit as one or more volumes. The storage management computer includes a first memory for storing task information including contents of an operation process performed on the storage apparatus, as well as a scheduled starting time and scheduled termination time of a process. In the case where first task information is stored in the first memory, when resources used in the process of second task information stored in the first memory are the same as resources used in the process of the first task information, the storage management computer computes times required for executing the first task information and the second task information, based on a
(Continued)

time during which the processes of the first and second task information conflict with each other.

17 Claims, 37 Drawing Sheets

(51) Int. Cl.
 *G06F 9/46* (2006.01)
 *G06Q 10/06* (2012.01)
 *G05B 19/418* (2006.01)

(52) U.S. Cl.
 CPC .......... *G05B 19/41865* (2013.01); *G06F 9/46* (2013.01); *G06Q 10/06* (2013.01); *Y10S 707/99937* (2013.01)

(56) References Cited

U.S. PATENT DOCUMENTS

| | | | | |
|---|---|---|---|---|
| 7,555,614 | B1* | 6/2009 | Haynes | G06F 9/524 711/152 |
| 7,793,294 | B2* | 9/2010 | Haeri | G06F 9/4887 718/102 |
| 8,200,715 | B1* | 6/2012 | Kraft | G06F 9/4428 707/802 |
| 8,239,588 | B2 | 8/2012 | Ohtani | |
| 8,627,319 | B1 | 1/2014 | Xu | |
| 9,052,944 | B2* | 6/2015 | Moir | G06F 9/466 |
| 9,411,636 | B1* | 8/2016 | Ting | G06F 9/4843 |
| 2002/0073260 | A1* | 6/2002 | Lin | G06F 13/24 710/200 |
| 2002/0198924 | A1* | 12/2002 | Akashi | G06F 9/4881 718/102 |
| 2005/0086094 | A1 | 4/2005 | Trautmann et al. | |
| 2007/0011683 | A1 | 1/2007 | Helander | |
| 2008/0072013 | A1* | 3/2008 | Yamamoto | G06F 9/30101 712/42 |
| 2008/0126639 | A1* | 5/2008 | Oakes | G06F 9/5016 710/111 |
| 2008/0201542 | A1 | 8/2008 | Maruyama et al. | |
| 2008/0216077 | A1 | 9/2008 | Emani et al. | |
| 2008/0295102 | A1 | 11/2008 | Akaike et al. | |
| 2010/0153945 | A1* | 6/2010 | Bansal | G06F 9/4881 718/1 |
| 2010/0325632 | A1 | 12/2010 | Guccione et al. | |
| 2012/0131309 | A1* | 5/2012 | Johnson | G06F 9/30 712/41 |

OTHER PUBLICATIONS

Japan Patent Office Notification of Reason for Refusal on application 2010-228076 mailed Jun. 11, 2013; pp. 1-2.
Written Opinion cited in related International Patent Application No. PCT/JP2010/068493, issued Dec. 7, 2010.

* cited by examiner

FIG. 6

| VOLUME IDENTIFIER 12120 | LOGICAL STARTING ADDRESS 12121 | LOGICAL ENDING ADDRESS 12122 | POOL NUMBER 12123 | RESOURCE IDENTIFIER 12124 | PHYSICAL STARTING ADDRESS 12125 | PHYSICAL ENDING ADDRESS 12126 |
|---|---|---|---|---|---|---|
| 0 | 0 | 999 | 0 | 0 | 1000 | 1999 |
|  | 1000 | 1999 |  | 1 | 0 | 999 |
|  | 2000 | 2999 |  | 2 | 0 | 999 |
|  | 3000 | 3999 |  | 2 | 1000 | 2999 |
|  | 4000 | 199999 |  | null | null | null |
| ... | ... | ... | ... | ... | ... | ... |

| RESOURCE IDENTIFIER 12130 | VOLUME IDENTIFIER 12131 | TIME 12132 | AVERAGE IOPS 12133 | MAXIMUM IOPS 12134 |
|---|---|---|---|---|
| 0 | 0 | 9:00-10:00 | 10 | 300 |
| | | 10:00-11:00 | 100 | 300 |
| | | 11:00-12:00 | 200 | 300 |
| | | ⋮ | ⋮ | ⋮ |
| | 1 | 9:00-10:00 | 50 | 300 |
| | | 10:00-11:00 | 60 | 300 |
| | | 11:00-12:00 | 100 | 300 |
| ⋮ | ⋮ | ⋮ | ⋮ | ⋮ |

| RESOURCE IDENTIFIER | EXTERNAL VOLUME INFORMATION |
|---|---|
| 1 | Storage3.1a2b.0 |
| . . . | . . . |

| APPARATUS IDENTIFIER | PROCESS NAME | UNIT | REQUIRED TIME |
|---|---|---|---|
| Storage 1 | NORMAL VOLUME CREATION (SSD) | 1MB | 100 Sec. |
| | NORMAL VOLUME CREATION (FC) | 1MB | 200 Sec. |
| | PATH ALLOCATION | 1Port | 30 Sec. |
| | PORT DISCOVERY | 1Port | 100 Sec. |
| | CREATING VIRTUAL RESOURCE | 1PG | 20 Sec. |
| | CREATING EXTERNAL VOLUME | 1 | 20 Sec. |
| | . . . | . . . | . . . |
| Storage 2 | NORMAL VOLUME CREATION (SSD) | 1MB | 100 Sec. |
| | NORMAL VOLUME CREATION (FC) | 1MB | 200 Sec. |
| | PATH ALLOCATION | 1Port | 30 Sec. |
| | . . . | . . . | . . . |
| . . . | . . . | . . . | . . . |

FIG. 11

| APPARATUS IDENTIFIER | RESOURCE NAME | RESOURCE IDENTIFIER | COEFFICIENT |
|---|---|---|---|
| Storage 1 | Parity Group | 0 | 1.8 |
| | Parity Group | 1 | 2.0 |
| | Parity Group | 2 | 1.92 |
| | Port | 0 | 1.9 |
| | Port | 1 | 2.1 |
| | ... | ... | ... |
| Storage 2 | Parity Group | 0 | 1.6 |
| | Parity Group | 1 | 1.5 |
| | Parity Group | 2 | 1.4 |
| | Port | 0 | 1.6 |
| ... | ... | ... | ... |

| APPARATUS IDENTIFIER | VOLUME IDENTIFIER | POOL IDENTIFIER | RESOURCE IDENTIFIER | EXTERNAL VOLUME IDENTIFIER | SPEED OF LINE (bps) | PORT IDENTIFIER |
|---|---|---|---|---|---|---|
| Storage 1 | 0 | 0 | 0 | 0 | - | - |
| | 1 | 1 | 0 | 1 | 4G | 0 |
| | 2 | 1 | 1 | 1 | 2G | 1 |
| | 3 | 2 | 1,2,3 | 0 | - | - |
| | 4 | 2 | 1,2,3 | 0 | - | - |
| ⋮ | ⋮ | ⋮ | ⋮ | ⋮ | ⋮ | ⋮ |

| EXTERNAL CONNECTION DESTINATION APPARATUS IDENTIFIER 51507 | EXTERNAL CONNECTION DESTINATION PHYSICAL RESOURCE IDENTIFIER 51508 | EXTERNAL CONNECTION DESTINATION VOLUME IDENTIFIER 51509 | VOLUME IDENTIFIER INCLUDED IN THE SAME PHYSICAL RESOURCE THAT IS NOT CONNECTED 51510 |
|---|---|---|---|
| - | - | - | - |
| Storage 2 | 0 | 0 | - |
| Storage 2 | 1 | 0 | 1 |
| - | - | - | - |
| - | - | - | - |
| ... | ... | ... | ... |

| APPARATUS IDENTIFIER | VOLUME IDENTIFIER | POOL NUMBER | RESOURCE TYPE | ALLOCATED SIZES |
|---|---|---|---|---|
| Storage 1 | 0 | 1 | FC,internal | 1000 GB |
| | | | SATA internal | 1000 GB |
| | | | FC,External | 2000 GB |
| ... | ... | ... | | ... |

FIG. 15

| APPARATUS IDENTIFIER | RESOURCE TYPE | READ PERFORMANCE | WRITE PERFORMANCE |
|---|---|---|---|
| Storage 1 | FC,internal | 10G/sec | 5G/sec |
| | SATA,internal | 8G/sec | 4G/sec |
| | FC,external | 3G/sec | 1G/sec |
| ... | ... | ... | ... |

| APPARATUS IDENTIFIER | RESOURCE IDENTIFIER | VOLUME IDENTIFIER | TIME | IOPS | MAXIMUM IOPS |
|---|---|---|---|---|---|
| Storage 1 | 0 | 0 | 9:00-10:00 | 10 | 300 |
| | | | 10:00-11:00 | 100 | 300 |
| | | | 11:00-12:00 | 200 | 300 |
| | | | ⋮ | ⋮ | ⋮ |
| | | 1 | 9:00-10:00 | 50 | 300 |
| | | | 10:00-11:00 | 60 | 300 |
| | | | 11:00-12:00 | 100 | 300 |
| | | | ⋮ | ⋮ | ⋮ |
| ⋮ | ⋮ | ⋮ | | | |

| TASK IDENTIFIER 51900 | OPERATION 51901 | APPARATUS IDENTIFIER 1 51902 | APPARATUS IDENTIFIER 2 51903 | VOLUME IDENTIFIER 1 51904 | VOLUME IDENTIFIER 2 51905 | PORT IDENTIFIER 1 51906 | PORT IDENTIFIER 2 51907 |
|---|---|---|---|---|---|---|---|
| 1 | MIGRATION | Storage 1 | - | 1 | 2 | - | - |
| 2 | EXTERNAL CONNECTION SETTING | Storage 1 | Storage2 | 3 | 4 | 1 | 2 |
| 3 | BACKUP | Storage 1 | - | 5 | 6 | - | - |
| 4 | MIGRATION (DYNAMIC MIGRATION) | Storage 1 | - | 7 | - | - | - |
| ... | ... | ... | ... | ... | ... | ... | ... |

| ADMINISTRATOR-DESIGNATED STARTING TIME | ACTUAL STARTING TIME | ADMINISTRATOR-DESIGNATED TERMINATION TIME | ESTIMATED TERMINATION TIME |
|---|---|---|---|
| 2:00 | 3:00 | 6:00 | 7:00 |
| 3:00 | 3:00 | 6:00 | 7:00 |
| 4:00 | 3:00 | 6:00 | 6:00 |
| - | 4:00 | - | 5:00 |
| . . . | . . . | . . . | . . . |

STORAGE MANAGEMENT COMPUTER AND METHOD FOR AVOIDING CONFLICT BY ADJUSTING THE TASK STARTING TIME AND SWITCHING THE ORDER OF TASK EXECUTION

CROSS-REFERENCE TO RELATED PATENT APPLICATIONS

Japan Priority Application 2010-228076, filed Oct. 8, 2010 including the specification, drawings, claims and abstract, is incorporated herein by reference in its entirety. This application is a Continuation of U.S. application Ser. No. 12/999,176 (National Stage of PCT/JP2010/068493), filed Dec. 15, 2010, incorporated herein by reference in its entirety.

TECHNICAL FIELD

The present invention relates to a computer system including a storage system, and particularly to task management technology for executing storage operations asynchronously.

BACKGROUND ART

The background art related to this technical field includes U.S. Patent Application Publication No. 2008/0201542 (Patent Literature 1). This publication describes that "when one or more migration processes of data stored in a volume of a storage system is scheduled, data migration is executed by a specified date" (see the abstract).

CITATION LIST

Patent Literature

[PTL 1]
U.S. Patent Application Publication No. 2008/0201542

SUMMARY OF INVENTION

Technical Problem

In recent years, the amount of information that is held in the computer systems used in companies, local governments, government offices, and financial institutions has been increasing dramatically, as well as the number of computers or storage systems incorporated in the computer systems.

The number of objects of management that should be monitored or the number of objects to be configured increases as the number of computers or storage systems grows significantly, requiring many management operations to be performed. An administrator normally registers the management operations and the starting/termination times thereof as plans or tasks, instead of executing such many management operations accordingly. [The administrator] carries out the management on the objects of management by executing the registered task operations at the starting time. When registering a plurality of tasks, task execution times or the objects of management compete with one another sometimes. Therefore, in order to execute the tasks appropriately, task management needs to be performed in consideration of the impact of each of the tasks.

In the data migration technology described in Patent Literature 1, when the execution times conflict with one another or resources compete with one another, the time for starting competing data migration processes is changed regardless of whether the migration processes are completed by the termination time planned by the administrator. Thus, the time is likely to be changed, although each of the migration processes is, originally, supposed to be finished by the time planned by the administrator even when the processes are executed while they are competing with one another. As a result of placing a high priority on a higher-priority plan and changing the starting time so that the plans do not conflict with one another, the other plans might not be finished by the termination time, although these plans are, originally, supposed to be finished by the termination time.

The present invention was contrived in view of the problems described above, and an object thereof is to increase the precision of estimating task execution times when asynchronously executing a plurality of tasks having storage operations registered therein, and to improve the efficiency of an administrator's storage management work.

Solution to Problem

In order to solve the problems described above, for example, the configurations described in the scope of patent claims are adopted. The present application includes a plurality of means for solving these problems. An example thereof is a computer system, having: a storage apparatus coupled to a host computer via a network; and a storage management computer capable of accessing the storage apparatus and the host computer, wherein the storage apparatus has a storage unit for storing data read/written by the host computer and provides the host computer with a storage area of the storage unit as one or more volumes, and the storage management computer has a first memory for storing task information including contents of an operation process performed on the storage apparatus, as well as a scheduled starting time and scheduled termination time of a process, and, in the case where first task information is stored in the first memory, when resources used in the process of second task information stored in the first memory are the same as resources used in the process of the first task information, the storage management computer computes times required for executing the first task information and the second task information, based on a time during which the processes of the first and second task information conflict with each other.

Advantageous Effects of Invention

According to the computer system provided by the present invention, when a plurality of tasks having storage operations registered therein are executed asynchronously, the execution times can be estimated in consideration of the competition among the tasks, and the efficiency of a management work by a storage administrator can be improved.

Furthermore, according to the management computer provided by the present invention, the precision of estimating the execution times of the tasks of the storage operations can be increased, and thereby the efficiency of the management work by the storage administrator can be improved.

BRIEF DESCRIPTION OF DRAWINGS

FIG. 6 is a storage-side physical/logical storage area correspondence table according to the first embodiment.

FIG. 8 is a storage-side performance information management table according to the first embodiment.

FIG. 9 is an external volume management table according to the first embodiment.

FIG. 10 is a unit process required time table according to the first embodiment.

FIG. 11 is a task time estimation coefficient holding table according to the first embodiment.

FIG. 12 shows a volume management table (partial) according to the first embodiment.

FIG. 13 shows the volume management table (partial) according to the first embodiment.

FIG. 14 is a management-side physical/logical storage area correspondence table according to the first embodiment.

FIG. 15 is a disk-type performance information table according to the first embodiment.

FIG. 16 is a management-side performance information management table according to the first embodiment.

FIG. 17 shows a task management table (partial) according to the first embodiment.

FIG. 18 shows the task management table (partial) according to the first embodiment.

DESCRIPTION OF EMBODIMENTS

Embodiments of the present invention are described hereinafter with reference to the drawings. Note that the present invention is not limited thereto. In the following descriptions, information described in the embodiments are expressed by "aaa table." However, these information may be expressed by anything other than such a data structure as a table. Thus, these information are sometimes called "aaa information" with respect to the "aaa table" in order to describe that the information are not dependent on the data construct. Also, the term "identifiers" described hereinbelow are replaceable by "identification information," "ID," and the like. Furthermore, even when these information to be identified are expressed by numbers, the method of identification is not limited to the use of numbers, and therefore the information may be expressed by character strings or anything other than numbers. The term "program" is used as the subject of a sentence in the following descriptions. However, since the program is executed by a controller to use a memory and communication I/F for carrying out a certain process, the controller may be used as the subject. In addition, processes described with "program" as the subject may be the processes that are carried out by a computer such as a management computer. Also, a part or whole of the program may be realized by special software.

(1) System Configuration According to a First Embodiment

Figure 1:
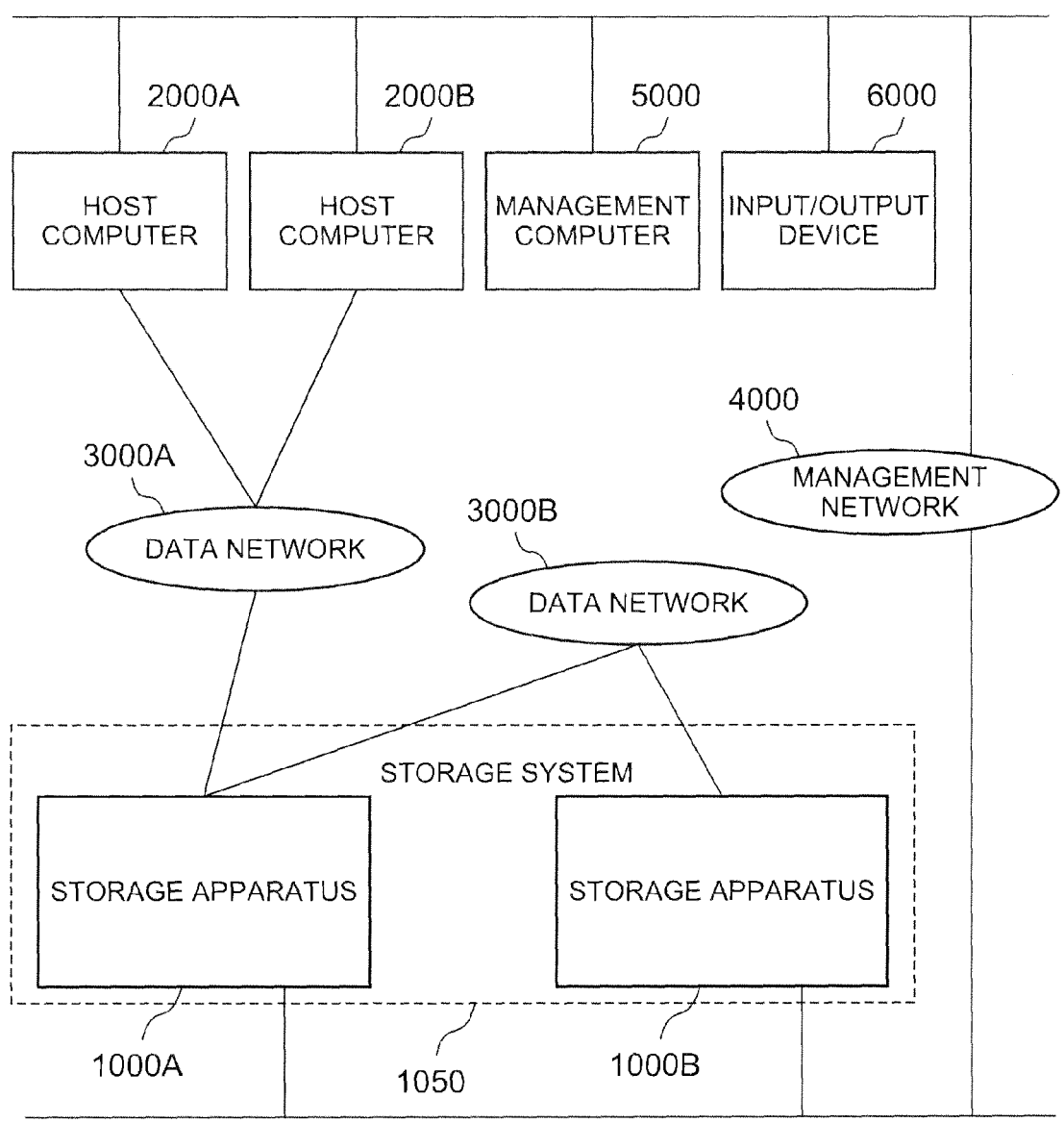
FIG. 1 is an entire configuration diagram of a computer system according to a first embodiment.

FIG. 1 shows the entire configuration of a computer system according to a first embodiment. In the computer system of the present embodiment, a plurality of storage apparatuses 1000 configure a storage system 1050, and the plurality of storage apparatuses 1000 are connected to a plurality of host computers 2000 by data networks 3000. When explicitly distinguishing one of the storage apparatuses to be connected, from a connection destination storage apparatus, the former storage apparatus is called "external connection source storage apparatus," and the latter storage apparatus is called "external connection destination storage apparatus."

Also, the data networks 3000 connecting the storage apparatuses 1000 and the host computers 2000 are illustrated as different data networks than the data networks 3000 connecting storage apparatuses 1000A and external connection destination storage apparatuses 1000B. However, these data networks may be the same.

Although the data networks 3000 according to the present embodiment are SANs (Storage Area Networks), the data networks may be IP (Internet Protocol) networks or other data communication networks.

The host computers 2000 and storage apparatuses 1000 are connected to a management computer 5000 via a management network 4000. Although the management network 4000 according to the present embodiment is an IP network, it may be a SAN or other data communication network. The data networks 3000 and the management network 4000 may be the same, and the host computers 2000 and the management computer 5000 may be the same computers.

An input/output device 6000 is a terminal device that is connected to the management computer 5000 via, for example, a network, receives an input from a user such as an administrator, transmits the input to the management computer 5000, receives a process result from the management computer 5000, and outputs the process result. The input/output device 6000 is configured by, for example, a keyboard and display. Note that the management computer 5000 may be configured by the input/output device 6000.

For the convenience of explanation, FIG. 1 shows two of the storage apparatuses 1000, one storage system 1050, two of the host computers 2000, and one management computer 5000. The number of each of these components is not limited thereto in the present embodiment.

Figure 2:
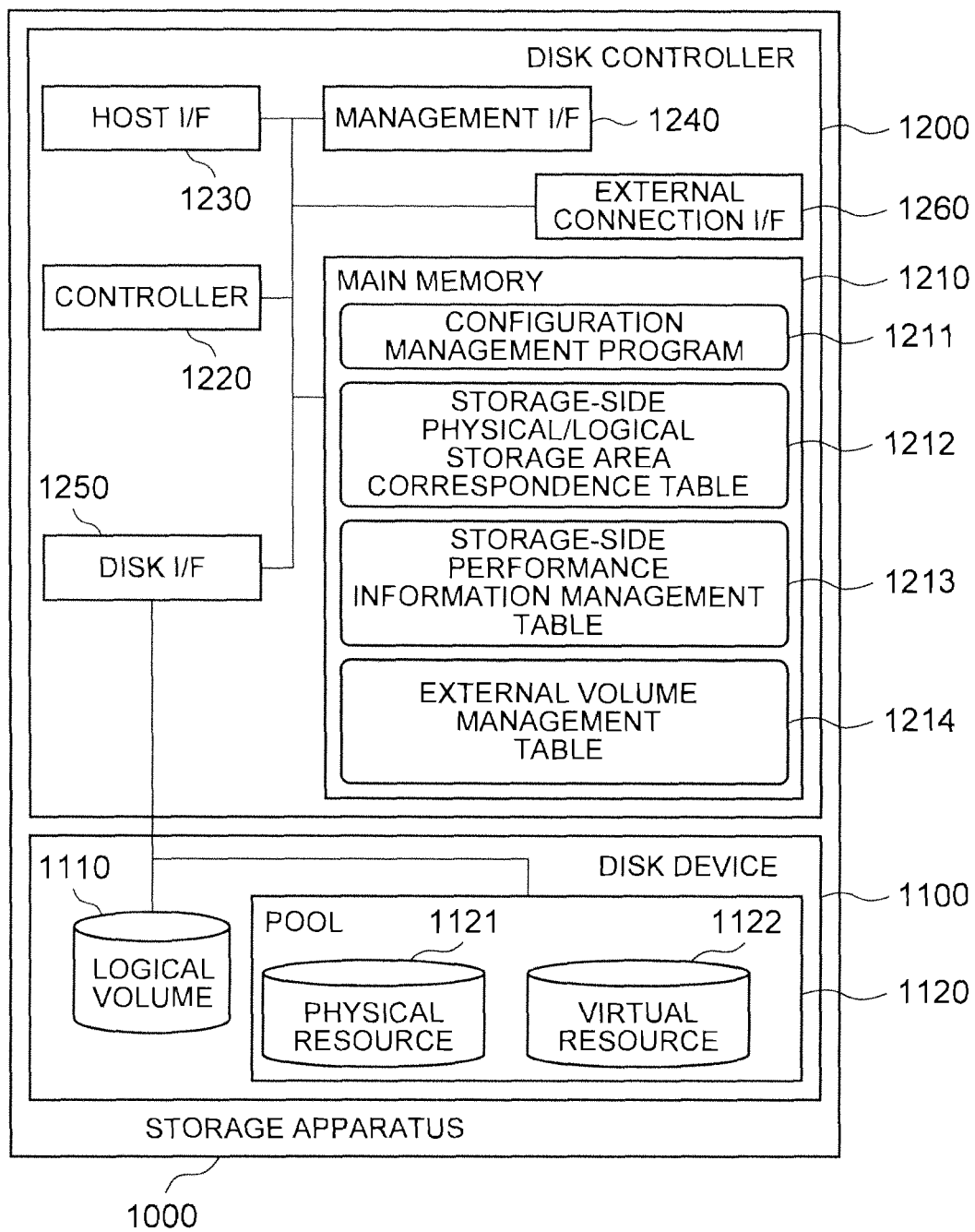
FIG. 2 is a configuration diagram of a storage system according to the first embodiment.

FIG. 2 shows a detailed configuration of each the storage apparatuses 1000. The storage apparatus 1000 is configured by a disk device 1100 for storing data, and a disk controller 1200 for controlling the inside of the storage apparatus.

The disk device 1100 has one or more of logical volumes 1110 and pools 1120. The logical volume here means a logical storage area, which is a unit of data storage. In the present embodiment, a logical device on RAID (Redundant Array of Independent Disks) configured by a plurality of hard disks is defined as a physical resource. A logical device that is created within the external connection source storage system by external connection technology is defined as a virtual resource.

Each of the logical volumes 1110 is generated from one or more of physical resources 1121 or virtual resources 1122 and stores the data used by the host computer 2000. For the convenience of explanation, only one pool 1120 is shown in FIG. 2, but the number of the pools is not limited in the present embodiment. A plurality of types of logical volumes exist in the logical volume 1110, which are be described with reference to FIG. 3.

The pool 1120 has one or more of the physical resources 1121 and one or more of the virtual resources. The pool 1120 is a logical group for collectively managing the physical resources 1121 or virtual resources 1122 from a management perspective. There are RAID types as an example of a management perspective. Examples of the RAID type include a RAID 0 that brings together a plurality of hard disks into one group and provides it as a massive storage area in order to provide a large capacity, and a RAID 1 that performs mirroring between hard disks in order to increase the redundancy of the hard disks. For the convenience of explanation, one of the physical resources 1121 and one of the virtual resources 1122 coexist within one pool 1120 as shown in FIG. 2, but the pool may include only the physical resource 1121 or only the virtual resource 1122.

The disk controller 1200 has a main memory 1210, controller 1220, host I/F 1230, management I/F 1240, disk I/F 1250, and external connection I/F. The external connection I/F may not be necessary in a storage apparatus used as the external connection destination storage apparatus 1000B.

The main memory 1210 stores therein a configuration management program 1211, storage-side physical/logical storage area correspondence table 1212, storage-side performance information management table 1213, and external volume management table 1214.

The configuration management program 1211 is a program for referring to or updating the storage-side physical/logical storage area correspondence table 1212, storage-side performance information management table 1213, and external volume management table 1214, and further communicating configuration information and performance information on the storage apparatus with a system management program 5110 of the management computer, which is described hereinafter. Note that the external volume management table 1214 may not be stored in the storage apparatus used as the external storage apparatus 1000. Moreover, when the storage apparatus 1000 does not correspond to a thin provisioning function described hereinafter, the storage-side physical/logical storage area correspondence table 1212 may not be stored in the storage apparatus 1000. Each of the tables is described hereinafter in detail with reference to FIG. 6 and the subsequent drawings.

The controller 1220 reads and executes the configuration management program 1211 stored in the main memory 1210.

The host I/F 1230 is an interface for connection with any of the data networks 3000 and transmits/receives data and control commands to/from the host computers 2000. The management I/F 1240 is an interface for communication with the management network 4000 and transmits/receives data and control commands to/from the host computers 2000 and the management computer 5000. The disk I/F 1250 is an interface for the disk device 1100 and transmits/receives data and control commands thereto/therefrom. The external connection I/F 1260 is an interface for connection with any of the data networks 3000 and transmits/receives data and control commands to/from the external storage apparatus 1000.

As described above, the storage apparatus 1000 includes the disk controller 1200 and one or more hard disks configuring the physical resource 1121. Note that the pool 1120, virtual resource 1122, logical volume 1110, and physical resource 1121 that are mentioned above are not actually necessarily included in the disk device 1100 shown in FIG. 2, because these components are logical or virtual presences that exist due to the processes performed by the disk controller 1200. The disk controller generates one or more logical volumes from storage areas of the hard disks and provides the logical volumes to the host computer. As the hard disks, for example, a FC (Fibre Channel) disk, SCSI (Small Computer System Interface) disk, SATA disk, ATA (AT Attachment) disk, SAS (Serial Attached SCSI) disk and the like can be used. In addition, for example, a flash memory, FeRAM (Ferroelectric Random Access Memory), MRAM (Magnetoresistive Random Access Memory), phase-change memory (Ovonic Unified Memory), RRAM (Resistance RAM), and various other storage units can be used.

In FIG. 2, the line connecting the logical volume 1110 and the pool 1120 to each other within the disk device 1100 illustrates a logical connection therebetween.

Figure 3:
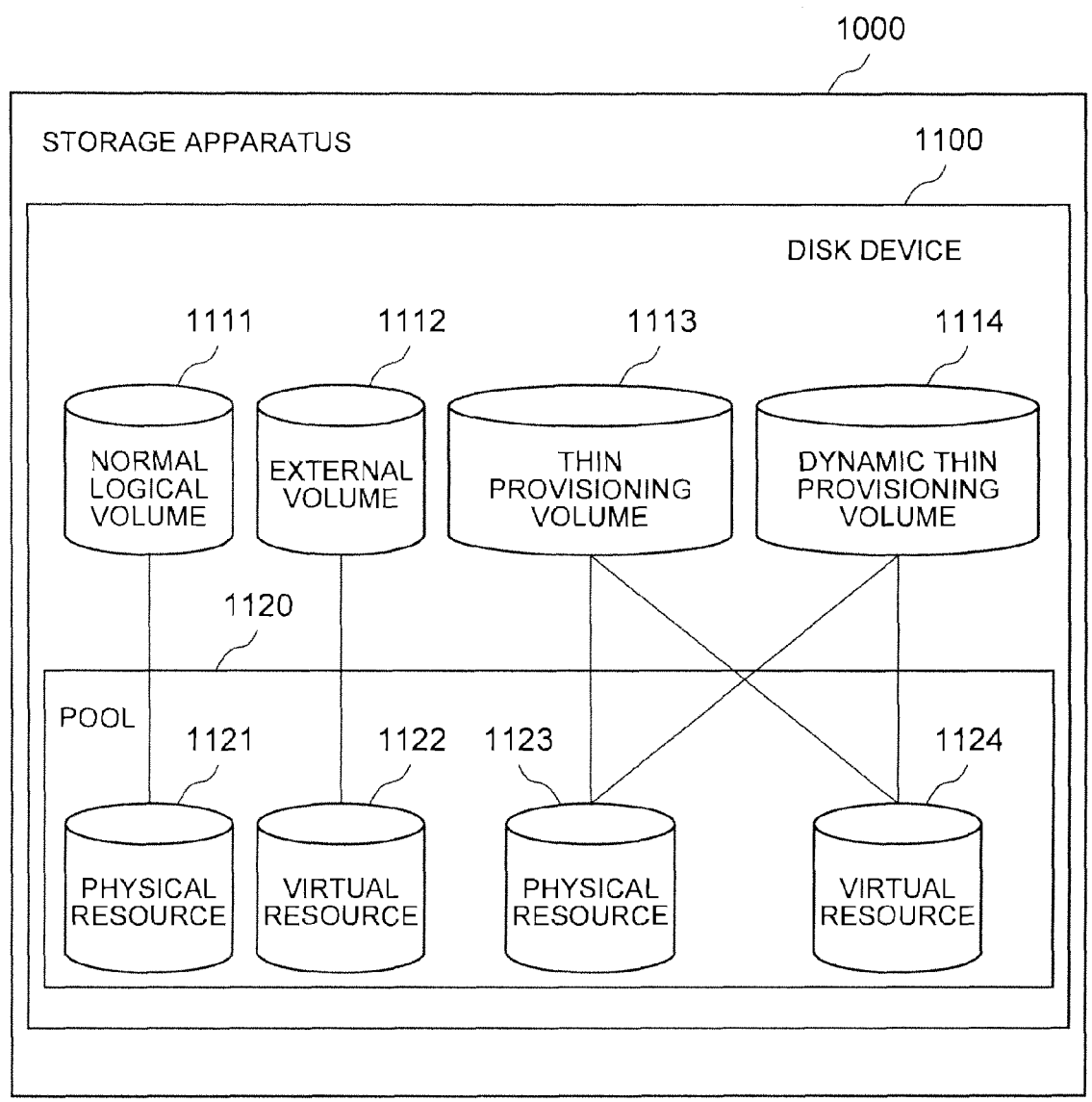
FIG. 3 is a diagram illustrating a type of a logical volume according to the first embodiment.

FIG. 3 shows the type of the logical volume 1110 configured by the storage apparatus 1000 based on the internal hard disks and the storage units of the other storage apparatuses. There are four types of logical volumes 1110: a normal logical volume 1111, external volume 1112, thin provisioning volume 1113, and dynamic thin provisioning volume 1114.

Thin provisioning here is technology capable of allocating a partial area ("segment" hereinafter) of a physical storage area to a logical volume and thereby dynamically expanding the storage area in order to effectively utilize the storage area. The physical resource or virtual resource provides the segment to be allocated to the thin provisioning logical volume.

The normal logical volume 1111 is a logical storage area configured by the physical resource 1121 (corresponding to a parity group (PG)) configured by the hard disks. The external volume 1112 is a logical storage area that has the entity thereof existing in the external connection destination storage 1000B and is configured by the virtual resource 1122.

The thin provisioning volume 1113 is a logical volume that can be expanded dynamically, as described above. The thin provisioning volume 1113 can dynamically expand the capacity thereof by allocating the segment from a physical resource 1123 or virtual resource 1124 included in the pool 1120, upon reception of an I/O from the host computer. The dynamic thin provisioning volume 1114 is also capable of dynamically expanding the capacity thereof as with the thin provisioning volume 1113. However, the dynamic thin provisioning volume 1114 can dynamically change the allocation by changing the segment that is already allocated once, to another segment having different responsiveness and reliability, in response to the status of an access to the logical volume. For the convenience of explanation, as shown in FIG. 3, the thin provisioning volume 1113 and the dynamic thin provisioning volume 1114 are allocated the segments from both the physical resource 1123 and the virtual resource 1124 but may be allocated the segment from only either one of the resources.

Figure 4:
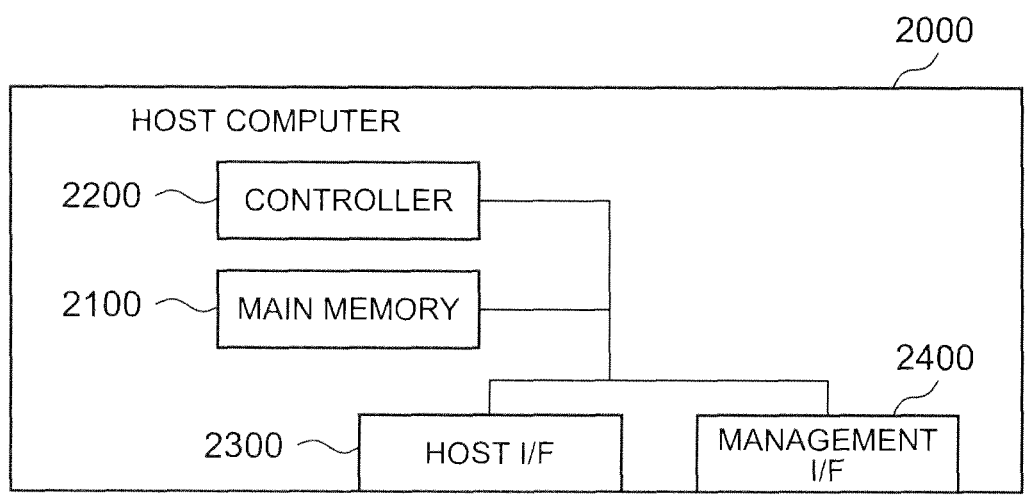
FIG. 4 is a configuration diagram of a host computer according to the first embodiment.

FIG. 4 shows a detailed configuration of the host computer 2000. The host computer 2000 is configured by a main memory 2100, controller 2200, host I/F 2300, and management I/F 2400. Note that the host computer 2000 may have an input/output device (keyboard, display device, etc.) that is not shown. The host I/F 2300 is an interface for connection with any of the data networks 3000 and transmits/receives data and control commands to/from the storage apparatus 1000. The management I/F 2400 is an interface for connection with the management network 4000 and transmits/receives data and control commands to/from the storage apparatus 1000 and the management computer 5000.

Figure 5:
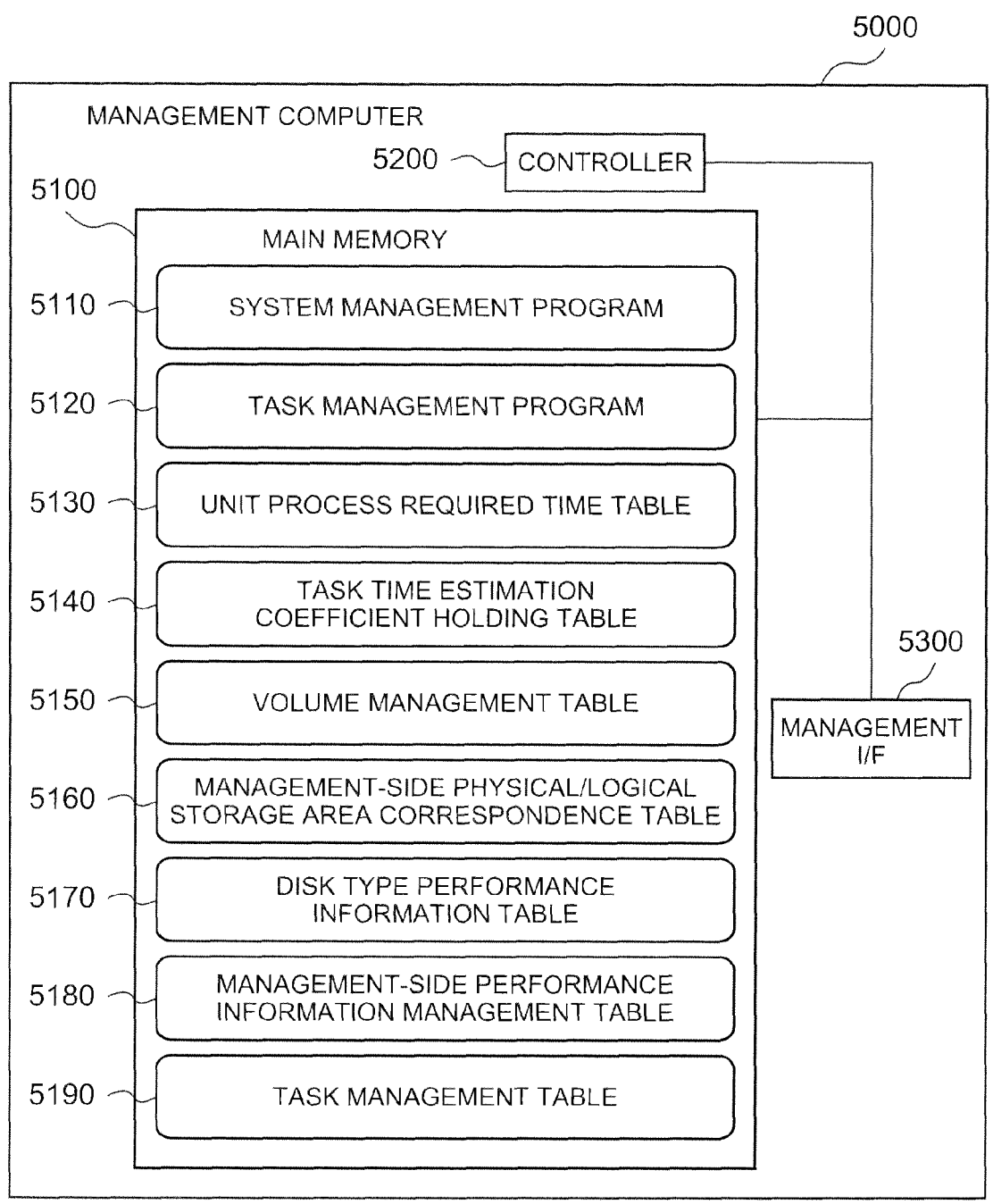
FIG. 5 is a configuration diagram of a management computer according to the first embodiment.

FIG. 5 shows a detailed configuration of the management computer 5000. The management computer 5000 is configured by a main memory 5100, controller 5200, and management I/F 5300. Note that the management computer 5000 may have a device corresponding to an input/output device 6000 that is not shown (such as a keyboard, display device, and the like).

The main memory 5100 stores therein a system management program 5110, task management program 5120, unit process required time table 5130, task time estimation coefficient holding table 5140, volume management table 5150, management-side physical/logical storage area correspondence table 5160, disk type performance information table 5170, management-side performance information management table 5180, and task management table 5190. The system management program 5110 is a program for acquiring information on the storage apparatus 1000 from the configuration management program 1211 of the storage apparatus 1000, to refer to and update the volume management table 5150, management-side physical/logical storage area correspondence table 5160, and management-side performance information management table 5180. The task management program 5120 is a program for referring to and updating the unit process required time table 5130 and the disk type performance information table 5170, to refer to and update the task type estimation coefficient holding table 5140 and the task management table 5190. Each of these tables is described hereinafter in detail with reference to FIG. 10 and the subsequent diagrams.

The controller 5200 reads and executes the system management program 5110 stored in the main memory 5100.

The management I/F 5300 is an interface for connection with the management network 4000 and transmits/receives data and control commands to/from the storage apparatus 1000 and the host computer 2000.

Although not shown, the storage apparatus 1000, the host computer 2000 and the management computer 5000 can be provided with a reader such as a portable storage medium.

The abovementioned functional parts of the storage apparatus 1000, host computer 2000 and management computer 5000 are realized by the programs that are read from, for example, the corresponding main memories and executed by the corresponding controllers. Each of the programs may be stored in the main memory of the each apparatus or introduced from the other apparatus to the main memory via an available medium, according to need. Examples of the medium include a recording medium detachable with respect to a reader, and a communication medium such as a network and a carrier wave or digital signal propagated through the network.

FIG. 6 shows the details of the storage-side physical/logical storage area correspondence table 1212. The storage-side physical/logical storage area correspondence table 1212 is a table showing a correspondence relationship between a logical address of the logical volume 1110 and address of the physical resource 1121 or virtual resource 1122 in the thin provisioning function. The storage-side physical/logical storage area correspondence table 1212 includes, specifically, the following information:

(12120) A volume identifier for identifying the volumes;
(12121) A logical starting address indicating a starting address of a segment allocated to the logical volume 1110;
(12122) A logical ending address indicating an ending address of the segment allocated to the logical volume 1110;
(12123) A pool number, which is an identifier of a pool having a resource from which a segment is allocated;
(12124) A resource identifier, which is an identifier of the physical resource 1121 or virtual resource 1122 within the pool;
(12125) A physical starting address indicating a starting address of the physical resource 1121 or virtual resource 1122 within the pool; and
(12126) A physical ending address indicating an ending address of the physical resource 1121 or virtual resource 1122 within the pool.

Figure 7:
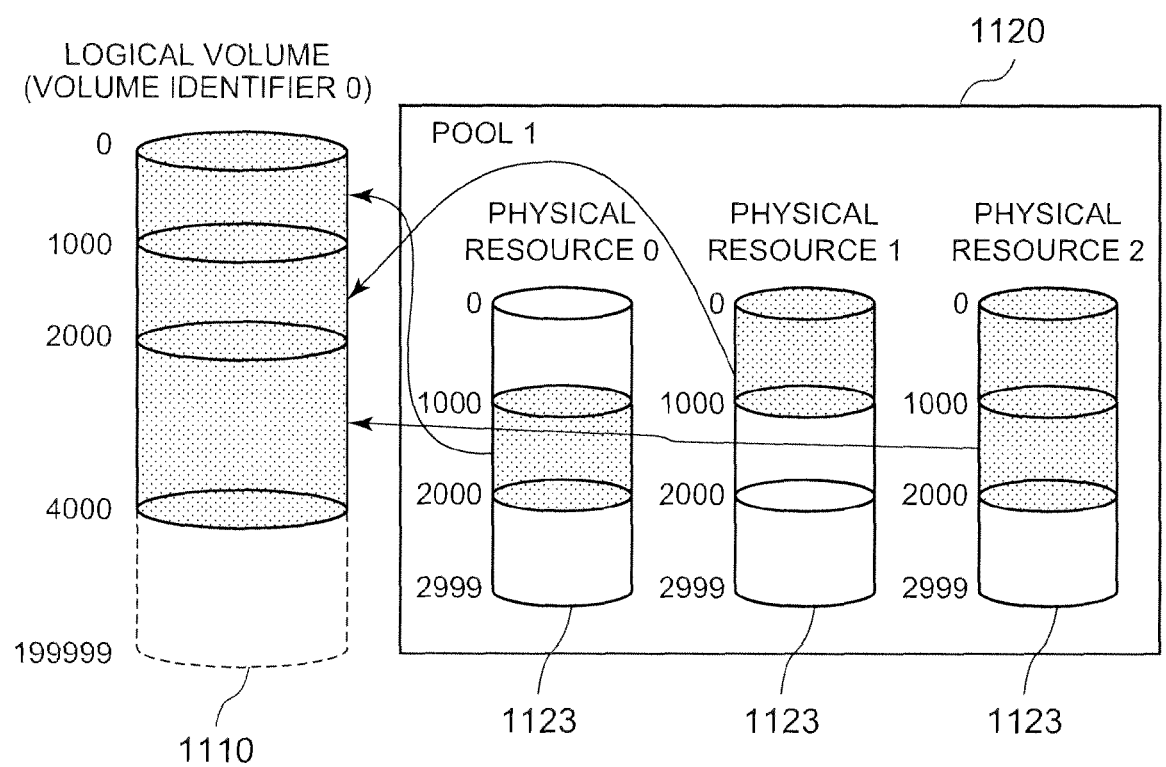
FIG. 7 is a diagram illustrating allocation of volumes to which segments according to the first embodiment are allocated.

FIG. 7 shows how to view the information included in the storage-side physical/logical storage area correspondence table 1212. FIG. 7 illustrates an example of the storage-side physical/logical storage area correspondence table 1212 shown in FIG. 6. As shown in FIG. 7, the block between the block number 1000 of a physical resource 0 of a pool 1 and the block number 1999 of the same corresponds to the block between the block number 0 of a logical volume (identifier 0) and the block number 999 of the same. Similarly, the block between the block number 0 of a physical resource 1 and the block number 999 of the same corresponds to the block between the block number 1000 of the logical volume (identifier 0) and the block number 1999 of the same. The block between the block number 0 of a physical resource 2 and the block number 2999 of the same corresponds to the block between the block number 2000 of the logical volume (identifier 0) and the block number 3999. The block between the block number 4000 of the logical volume and the block number 199999 of the same is not allocated any physical resource. Note that this correspondence relationship is dynamically changed in the dynamic thin provisioning volume 1114.

FIG. 8 shows the details of the storage-side performance information management table 1213. In the storage-side performance management table 1213, the average value of IOPS (Input Output Per Second) of a certain volume per unit time is saved as a load, or performance information, for each time. The IOPS of a certain volume means the frequency of access to the volume per unit time, the volume being designated by the host computer. Note that the access here means at least either one of data reading and data writing.

More specifically, the storage-side performance information management table 1213 also includes the following information:
(12130) A resource identifier for identifying the physical resource 1121 or virtual resource 1122;
(12131) A volume identifier for identifying a volume;
(12132) A time interval for calculating the average IOPS. Note that FIG. 8 shows an hourly average IOPS, but the time interval is not particularly limited to one hour. In addition, not only the information corresponding to one day but also the information corresponding to one week may be held. For example, in the case of seven days where each day is divided into 24 hours, an average IOPS of 24×7=168 entries may be held for one volume, in which case the tendency of an hourly load of the week can be held with respect to one volume;
(12133) The average IOPS per unit time; and
(12134) The maximum IOPS per unit time, which can be handled by a volume. A catalog value is held as a reference to indicate the amount of load of the average IOPS mentioned in 12133.

FIG. 9 shows the details of the external volume management table 1214. The external volume management table 1214 is a table showing a relationship between the virtual resource 1122 within the external connection source storage apparatus and the logical volume 1110 within the external connection destination storage apparatus 1000B. More specifically, the external volume management table 1214 includes the following information:
(12140) A resource identifier for identifying the virtual resource 1122 within the external connection source storage apparatus 1000A; and
(12141) External volume information for specifying the logical volume 1110 within the external connection destination storage apparatus 1000B that corresponds to the virtual resource 1122 within the external connection source storage apparatus 1000A. The external volume information may be any form of information as long as it can specify a storage apparatus, port and volume. For example, as illustrated in FIG. 9, the storage apparatus, port and volume can be "Storage3," "1a2b," and "0." respectively, in some embodiments.
(12140) A resource identifier for identifying the virtual resource 1122 within the external connection source storage apparatus 1000A; and
(12141) External volume information for specifying the logical volume 1110 within the external connection destination storage apparatus 1000B that corresponds to the virtual resource 1122 within the external connection source storage apparatus 1000A. The external volume information may be any form of information as long as it can specify a storage apparatus, port and volume.

FIG. 10 shows the details of the unit process required time table 5130. The unit process required time table 5130 is a table for saving a required time (catalog value) as a reference used for executing each operation in each storage apparatus. Particularly a time required for an operation independent of the volume size and transfer speed of a network is saved in this table. More specifically, the table includes the following information:
(51300) An apparatus identifier for specifying the storage apparatus 1000;
(51301) The name of an operation used for executing a storage operation;
(51302) An operation unit used for executing a storage operation. This is described when the required time is changed by the operation unit; and
(51303) The catalog value of the time required for an operation for each operation unit.

FIG. 11 shows the details of the task time estimation coefficient holding table 5140. The task time estimation coefficient holding table 5140 is a table for holding an indication value (coefficient) that indicates how much the processing time increases as compared to the processing time required in a single process performed on competing resources when the resources compete with one another in a plurality of tasks. An initial value of this indication value holds a predetermined value, but the indication value is corrected as needed, by obtaining a difference between the actual processing time obtained as a result of executing each task and the estimated time that uses this indication value. More specifically, this table includes the following information:
(51400) An apparatus identifier for specifying the storage apparatus 1000;
(51401) A resource name representing a resource held by the storage apparatus 1000. The resource here is different from the physical resource 1121 and held by the storage apparatus. The resource also indicates a component that is likely to compete with another resource, and includes not only a physical resource but also a port and so on;
(51402) An identifier for specifying the resource described in 51401; and
(51403) A coefficient indicating the ratio thereof to a processing time compared to the processing time required in a single process. For example, when one minute is required for creating a volume of 1 TB in a certain parity group when there is no competition and when two minutes are required for creating a volume of 1 TB in the parity group during the execution of competing tasks, the value of the coefficient is 2.0.

FIGS. 12 and 13 show the details of the volume management table 5150. For convenience of page space, the table is divided into two, but both FIGS. 12 and 13 illustrate one volume management table 5150. The volume management table 5150 is a table for showing information on the resources related to a certain logical volume (physical resources, virtual resources, ports, and other logical volumes). The table is used for checking the presence of tasks that include the resources affecting the operations executed in the respective tasks and the objects to be operated. More specifically, the table includes the following information:

(51500) An apparatus identifier for specifying the storage apparatus 1000;

(51501) A volume identifier for specifying the logical volume 1110;

(51502) A pool identifier indicating the pool 1120 to which the logical volume 1110 belongs;

(51503) A resource identifier indicating the physical resource 1121 or virtual resource 1122 to which the logical volume 1110 belongs. The logical volume 1110 is the thin provisioning volume 1113, dynamic thin provisioning volume 1114, or normal volume, and when this is a logical volume extending to the physical resource, a plurality of values might be described in this column;

(51504) An identifier indicating whether the logical volume 1110 is an external volume or not. In FIG. 12, a numerical value 1 represents an external volume, and 0 a volume other than the external volume. However, the identifier of the logical volume 1110 is not necessarily expressed by the values 1 and 0;

(51505) Speed of a line connecting the storage apparatuses when the logical volume 1110 is the external volume;

(51506) A port identifier for indicating a port utilized by the external connection source storage apparatus 1000A;

(51507) An external connection destination apparatus identifier for specifying the external connection destination storage apparatus 1000B;

(51508) An external connection destination physical resource identifier for specifying a physical resource within the external connection destination storage apparatus 1000B;

(51509) An external connection destination volume identifier for specifying a logical volume within the external connection destination storage apparatus 1000B; and (51510) An identifier of a logical volume, other than the one described in 51509, of the volumes included in the physical resource within the external connection destination storage apparatus 1000B. This volume also is considered a target that is likely to compete when being processed.

FIG. 14 shows the details of the management-side physical/logical storage area correspondence table 5160. The management-side physical/logical storage area correspondence table 5160 is created by allowing the system management program 5110 to appropriately acquire the information of in the storage-side physical/logical storage area correspondence table 1212. However, in consideration of the capacity of a management server, instead of directly holding the correspondences of all of the physical/logical storage areas, the physical/logical storage areas are classified into the types of the physical resources, and only the allocation size of each physical/logical storage area is held. More specifically, the table includes the following values:

(51600) An apparatus identifier for specifying the storage apparatus 1000;

(51601) A volume identifier for identifying a logical volume;

(51602) A pool number, which is an identifier of a pool having a resource from which a segment is allocated;

(51603) A resource type representing the type of a resource and indicating whether the type of the disk or a configuration resource of the logical volume is a storage physical resource or the virtual resource of the external connection destination storage apparatus; and (51604) The size of a resource allocated to the volume. A value obtained by adding the same type of resource from the information of the storage-side physical/logical storage area correspondence table 1212 is set.

FIG. 15 shows the details of the disk type performance information table 5170. The disk type performance information table 5170 is a table that describes read/write performance of the physical resource 1121 or the virtual resource 1122. More specifically, this table includes the following information:

(51700) An apparatus identifier for specifying the storage apparatus 1000;

(51701) A resource type representing the type of a resource and indicating whether the type of the disk or a configuration resource of the logical volume is a storage physical resource or the virtual resource of the external connection destination storage apparatus;

(51702) Read performance of a corresponding resource. This is described as G/Sec in FIG. 15 but can be described in any form; and (51703) Write performance of the corresponding resource. This is described as G/Sec in FIG. 15 but can be described in any form.

FIG. 16 shows the details of the management-side performance information management table 5180. The information held in the management-side performance information management table 5180 has an apparatus identifier in addition to the information held in the storage-side performance information management table 1213. More specifically, the management-side performance information management table 5180 includes the following information:

(51800) An apparatus identifier for specifying the storage apparatus 1000;

(51801) A resource identifier for identifying the physical resource 1121 or virtual resource 1122;

(51802) A volume identifier for identifying a volume;

(51803) A time interval for calculating the average IOPS. Note that FIG. 16 shows an hourly average IOPS, but the time interval is not particularly limited to one hour. In addition, not only the information corresponding to one day but also the information corresponding to one week may be held. For example, in the case of seven days where each day is divided into 24 hours, an average IOPS of 24×7=168 entries may be held for one volume, in which case the tendency of an hourly load of the week can be held with respect to one volume;

(51804) The average IOPS per unit time; and (51805) The maximum IOPS per unit time, which can be handled by a volume. A catalog value is held as a reference to indicate the amount of load of the average IOPS mentioned in 51804.

FIGS. 17 and 18 show the details of the task management table 5190. One task management table 5190 is divided and illustrated separately in FIGS. 17 and 18. The task management table 5190 holds the detailed information of the tasks registered by the administrator. More specifically, the table includes the following information:

(51900) An identifier of each task;

(51901) An operation indicating the contents of an operation executed in each task;

(51902) An identifier 1 of a storage apparatus to be operated in each task. Note that when there exist two storage apparatuses, an operation source and operation destination, the identifier of the operation source storage apparatus is shown;

(51903) An identifier 2 of a storage apparatus to be operated in each task. Note that when there exist two storage apparatuses, an operation source and operation destination, the identifier of the operation destination storage apparatus is shown. No values are set for an operation which is not executed to the two storage apparatuses;

(51904) An identifier 1 of a logical volume to be operated in each task. Note that when there exist two logical volumes, an operation source and operation destination, the identifier of the operation source logical volume is shown;

(51905) An identifier 2 of a logical volume to be operated in each task. Note that when there exist two logical volumes, an operation source and operation destination, the identifier of the operation destination logical volume is shown. When this logical volume is the thin provisioning volume or the dynamic thin provisioning volume, no values are entered in the relevant column;

(51906) An identifier of a port used in each task. Note that when there exist two ports, an operation source and operation destination, the identifier of the operation source port is shown. No values are set when there is no port to be operated;

(51907) An identifier of a port used in each task. Note that when there exist two ports, an operation source and operation destination, the identifier of the operation destination port is shown. No values are set when there is no port to be operated;

(51908) A starting time for executing a task designated by the administrator upon registration of the tasks;

(51909) A starting time for executing an actual task that is computed by the present invention;

(51910) A termination time for terminating the execution of the task designated by the administrator upon registration of the tasks. Whether the task is terminated as scheduled by the administrator is determined based on the task is completed by this termination time; and (51911) An estimated termination time for terminating the execution of the task, which is computed by the present invention.

(2) Operations According to the First Embodiment

Figure 34:
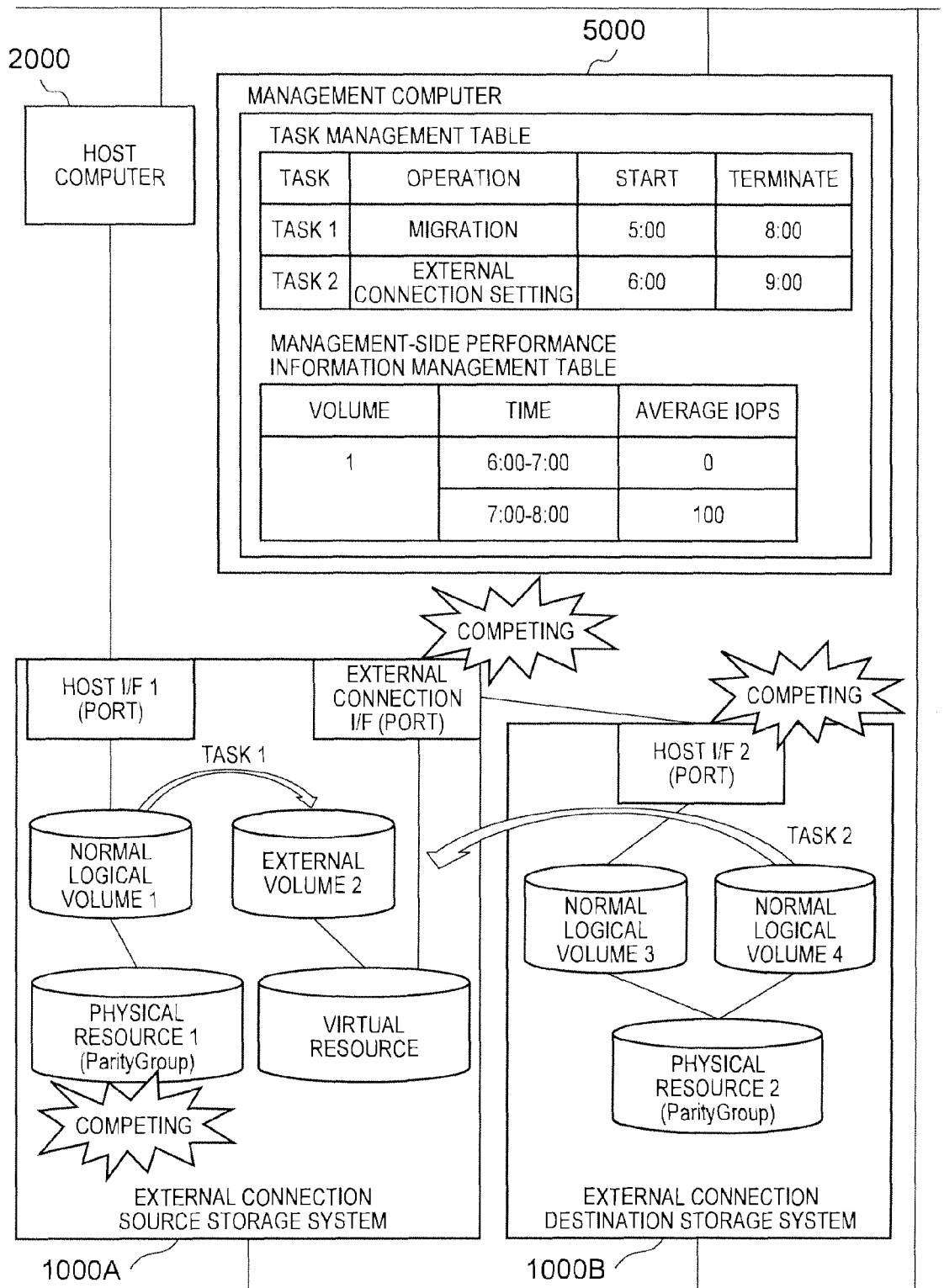
FIG. 34 is a diagram showing an example in which each task according to the first embodiment conflicts with an I/O from the host.

Operations of the first embodiment are shown next. FIG. 34 shows an example to which the first embodiment is applied. Registered in FIG. 34 are a task 1 in which a data migration process for migrating data from a normal logical volume 1 to an external volume 2 in the external connection source storage apparatus 1000A, and a task 2 in which an external connection is set so that a normal logical volume 4 of the external connection destination storage apparatus 1000B can be used in the external connection source storage apparatus. The external volume 2 is associated with a normal logical volume 3 of the external connection destination storage apparatus via the external connection I/F and a host I/F 2. The task 2 attempts to set an external connection for the normal logical volume 4 by using the external connection I/F and the host I/F 2. Consequently, the task 1 and the task 2 compete with each other over the external connection I/F and the host I/F 2. Moreover, since it is estimated from the management-side performance information management table that an I/O tends to be issued from the host computer to the normal logical volume 1 between 7:00 and 8:00, the process of the task 1 is affected. Therefore, it is assumed that the time scheduled for executing each task becomes longer than the time of a single task execution process. In the description of the operations of the following embodiment, the operations are applied not only to this example but also to any storage operations. In addition, FIG. 34 is made for simplifying the description, and therefore the names of the columns and volumes included in each table do not necessarily match the names described in the diagrams preceding FIG. 18.

First of all, the flow of the entire process is described with reference to FIGS. 19 and 20 (prerequisite process), FIG. 21 (the entire flow of registering the tasks), FIG. 22 (the entire flow of changing the storage apparatus configuration), and FIG. 23 (the entire flow after executing the tasks). The detailed processes are illustrated in FIGS. 24 to 33. The following processes are realized by the programs that are read from the main memories and executed by the controller of the apparatuses. These programs are configured by codes for performing various operations described hereinafter.

Figure 19:
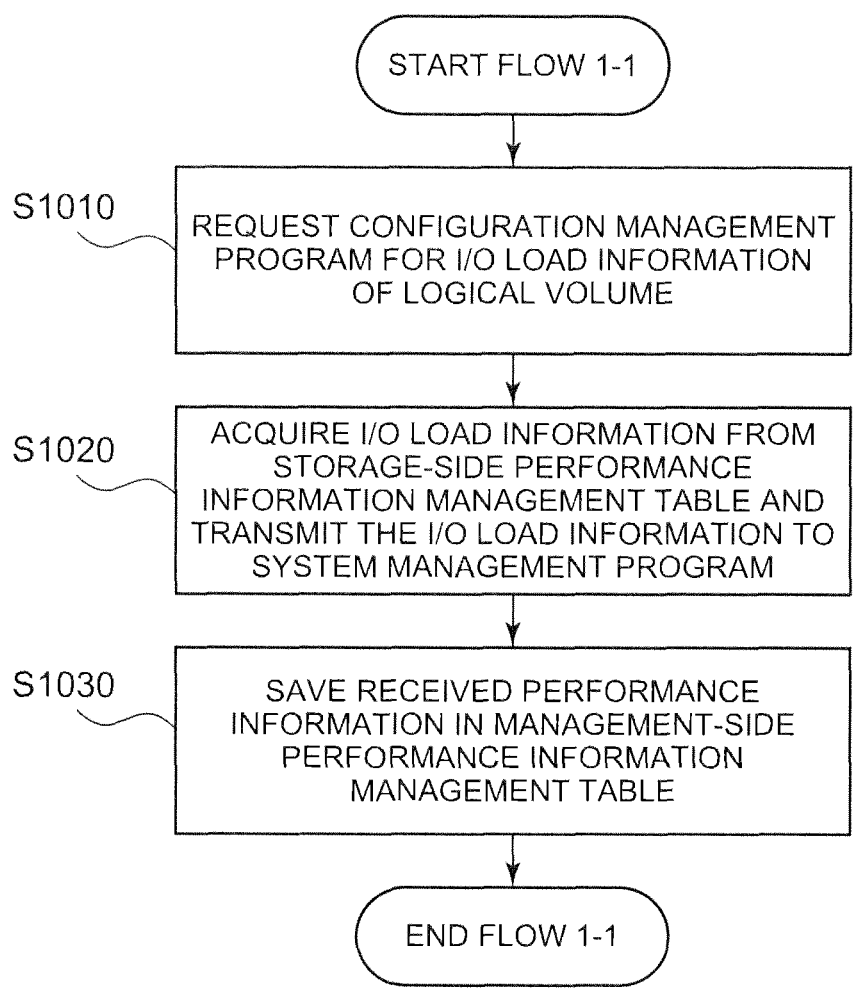
FIG. 19 is a diagram showing one prerequisite process of a flow of the entire process according to the first embodiment.

FIG. 19 shows a flow of a prerequisite process of the present invention, which is one of the processes executed periodically. A flow 1-1 is a process flow in which the system management program of the storage management computer 5000 acquires performance information (I/O load information) from the storage apparatus 1000 and holds the performance information. Specific steps of this process are as follows.

(S1010) The system management program 5110 requests the configuration management program 1211 for the I/O load information of the logical volume.

(S1020) The configuration management program 1211 of the storage apparatus 1000 acquires the I/O load information from the storage-side performance information management table 1213 and transmits the I/O load information to the system management program 5110.

(S1030) The system management program 5110 holds acquired the I/O load information in the management-side performance information management table 5180.

Figure 20:
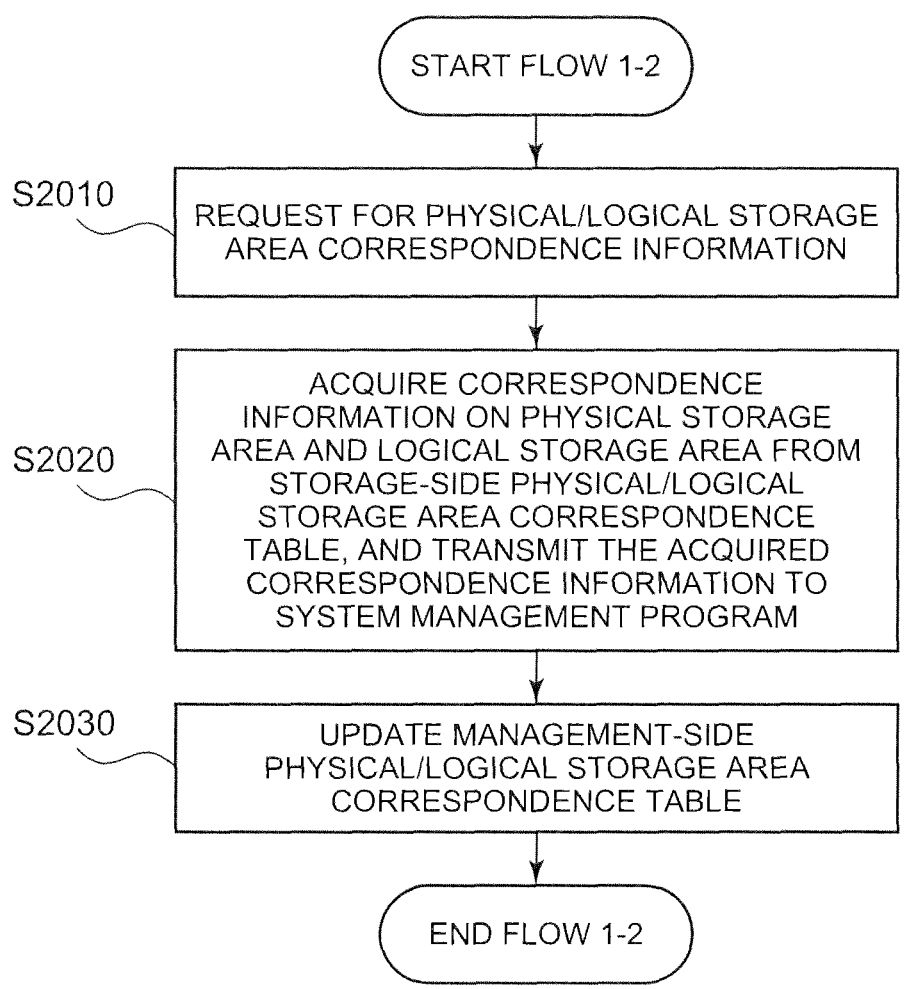
FIG. 20 is a diagram showing one prerequisite process of the flow of the entire process according to the first embodiment.

FIG. 20 shows a flow of the prerequisite process of the present invention, which is one of the processes executed periodically. A flow 1-2 is a flow in which the system management program of the storage management computer 5000 acquires physical/logical storage area correspondence information of the logical volume from the storage apparatus 1000. Specific steps of this flow are as follows.

(S2010) The system management program 5110 requests the storage apparatus 1000 for the physical/logical storage area correspondence information.

(S2020) The configuration management program 1211 of the storage apparatus 1000 acquires the physical/logical storage area correspondence information of the thin provisioning volume or the dynamic thin provisioning volume from the storage-side physical/logical storage area correspondence table 1212, and transmits the physical/logical storage area correspondence information to the storage management computer 5000.

(S2030) The system management program 5110 uses the received physical/logical storage area correspondence information to update the management-side physical/logical storage area correspondence table 5160.

Figure 21:
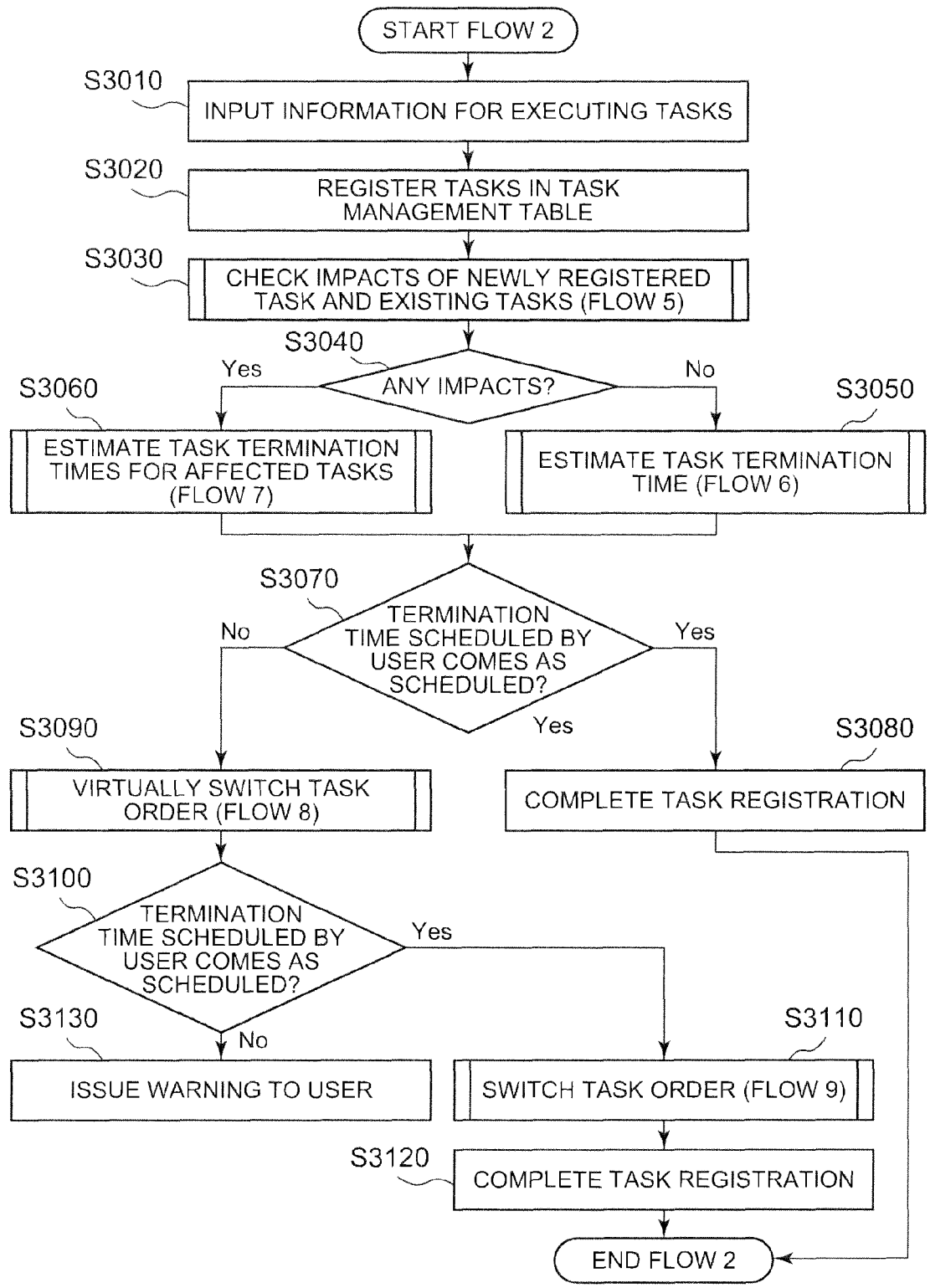
FIG. 21 is a diagram showing a process performed when registering a task, the process being apart of the flow of the entire process according to the first embodiment.

FIG. 21 shows a flow of process performed by the storage management computer 5000 when registering the tasks. Specific steps of this process are as follows.

(S3010) The input/output device 6000, for example, receives from the administrator the inputs of an operation for executing each task, target volume, used port, task starting time, and task termination time.

Figure 35:
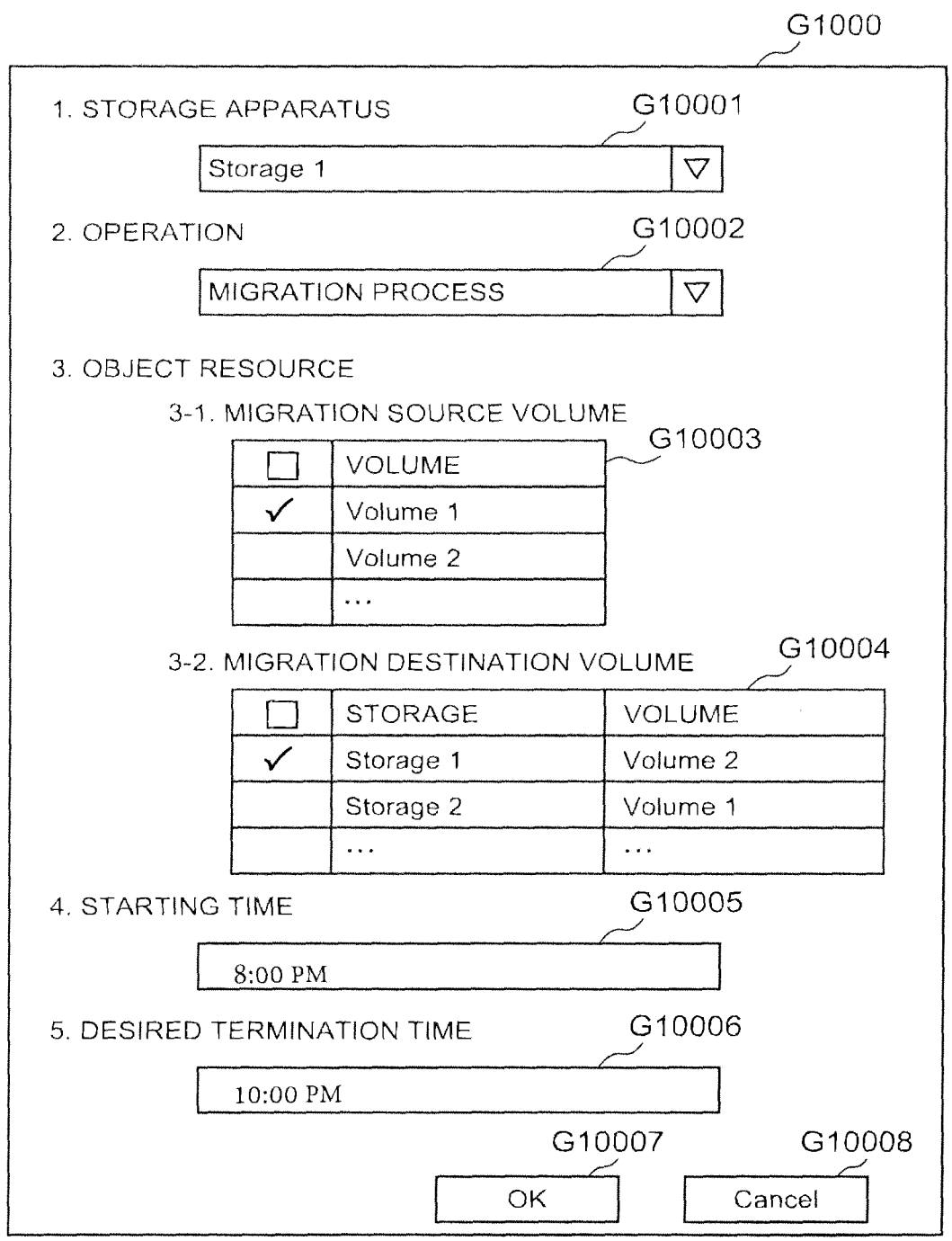
FIG. 35 is a diagram showing an example of an input screen used for setting a task to be subjected to the migration process in the first embodiment.
Figure 36:
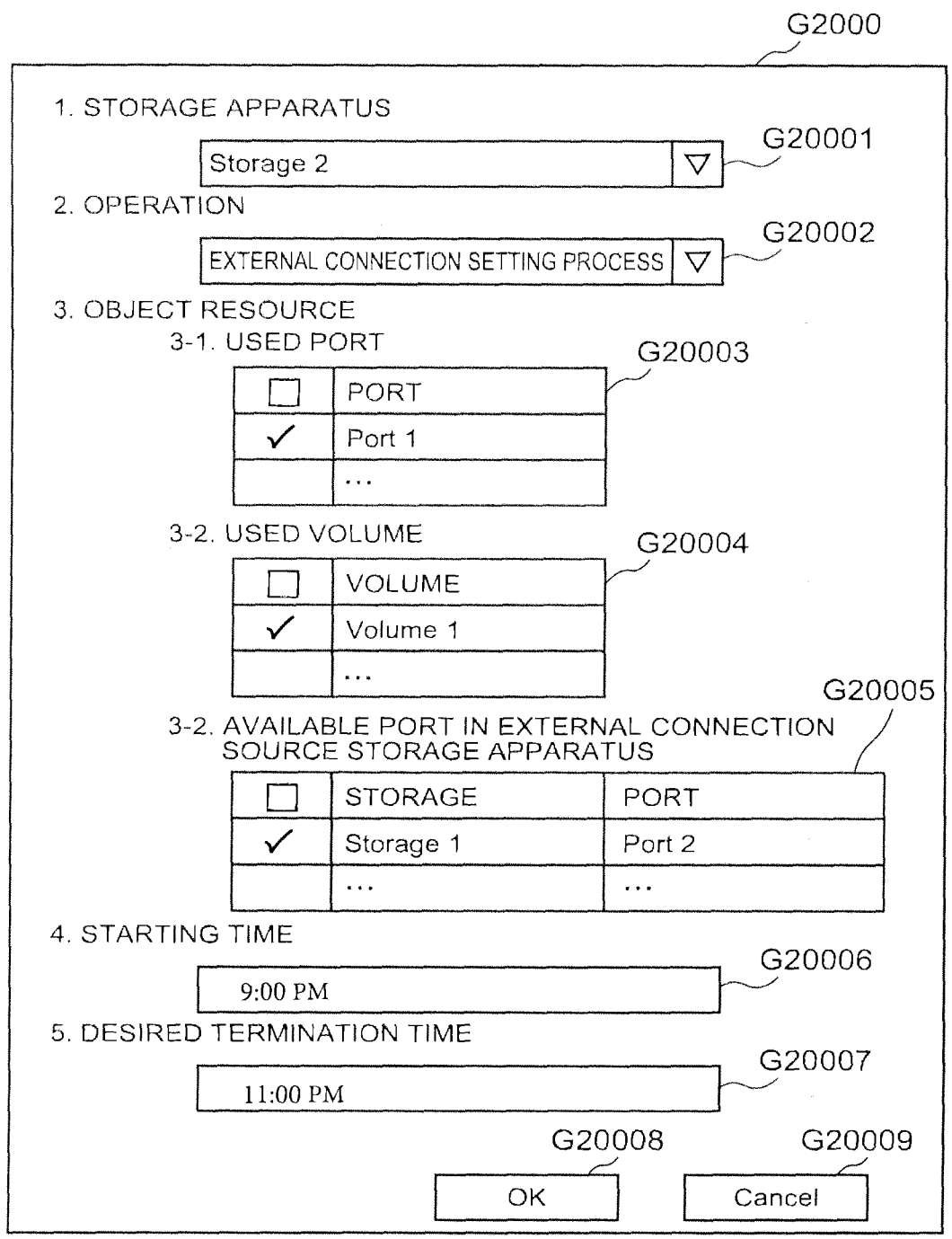
FIG. 36 is a diagram showing an example of the input screen used for setting a task to be subjected to the external connection setting process according to the first embodiment.

FIG. 35 shows an example of an input screen of the task management program used in the migration process. G1000 represents the screen. G10001 shows how a migration source storage apparatus is selected. G10002 shows a target to be operated. G10003 and G10004 show target resources. Because this example shows the migration process, a migration source volume and migration destination volume exist as the target resources. G10005 shows the starting time input by the administrator. G10006 shows the time requested by the administrator to terminate the task execution. G10007 represents a button used for determining task setting. G10008 shows a screen for canceling the task setting. The target resources vary depending on the contents of an operation. FIG. 36 shows an example of the input screen of the task management program used for carrying out an external connection setting process. In this case, G20003 shows the port of the external connection destination storage used for setting an external connection. G20004 shows the volume of the external connection destination storage. G20005 shows the port used in the external connection source storage. Note that G1000 and G2000 are screens that are displayed on a display device such as a display of the input/output device 6000.

(S3020) The task management program 5120 registers the information input in S3010, as a task, into the task management table 5190.

(S3030) The task management program 5120 checks the impacts of a newly registered task and the existing tasks. Checking the impacts here means checking whether there are competing resources in the new task and existing tasks. The detail of this step is described in flow 5 shown in FIG. 24.

(S3040) In S3030 it is determined whether the newly registered task affects the existing tasks. When the newly registered task does not affect the existing tasks, the process proceeds to S3050. When the newly registered task affects the existing tasks, the process proceeds to S3060.

(S3050) When the new task does not affect the existing tasks, the time required for executing the new task is estimated. The detail of this step is described in flow 6 shown in FIG. 25.

(S3060) When the new task affects the existing tasks in S3040, the information on all of the affected tasks are acquired, and the time required for executing each task is estimated. The detail of this step is described in flow 7 shown in FIG. 30.

(S3070) Whether or not the task execution time estimated in S3050 or S3060 satisfies the task termination time scheduled by the administrator is checked. When the execution time satisfies the task termination time, the process proceeds to S3080. When the execution time does not satisfy the task termination time, the process proceeds to S3090.

(S3080) Because the time for executing the newly registered task satisfies the task termination time scheduled by the administrator, the task registration process is completed.

(S3090) The order of the tasks or the starting time of each task is changed to achieve improvement so that the task termination time scheduled by the administrator can be satisfied. The detail of this step is described in flow 8 shown in FIG. 31.

(S3100) Whether the task termination time scheduled by the administrator is satisfied or not is checked as a result of changing the order of the tasks and the starting time of each task. When the task termination time scheduled by the administrator is satisfied, the process proceeds to S3110. When the task termination time is not satisfied, the process proceeds to S3130.

Figure 31:
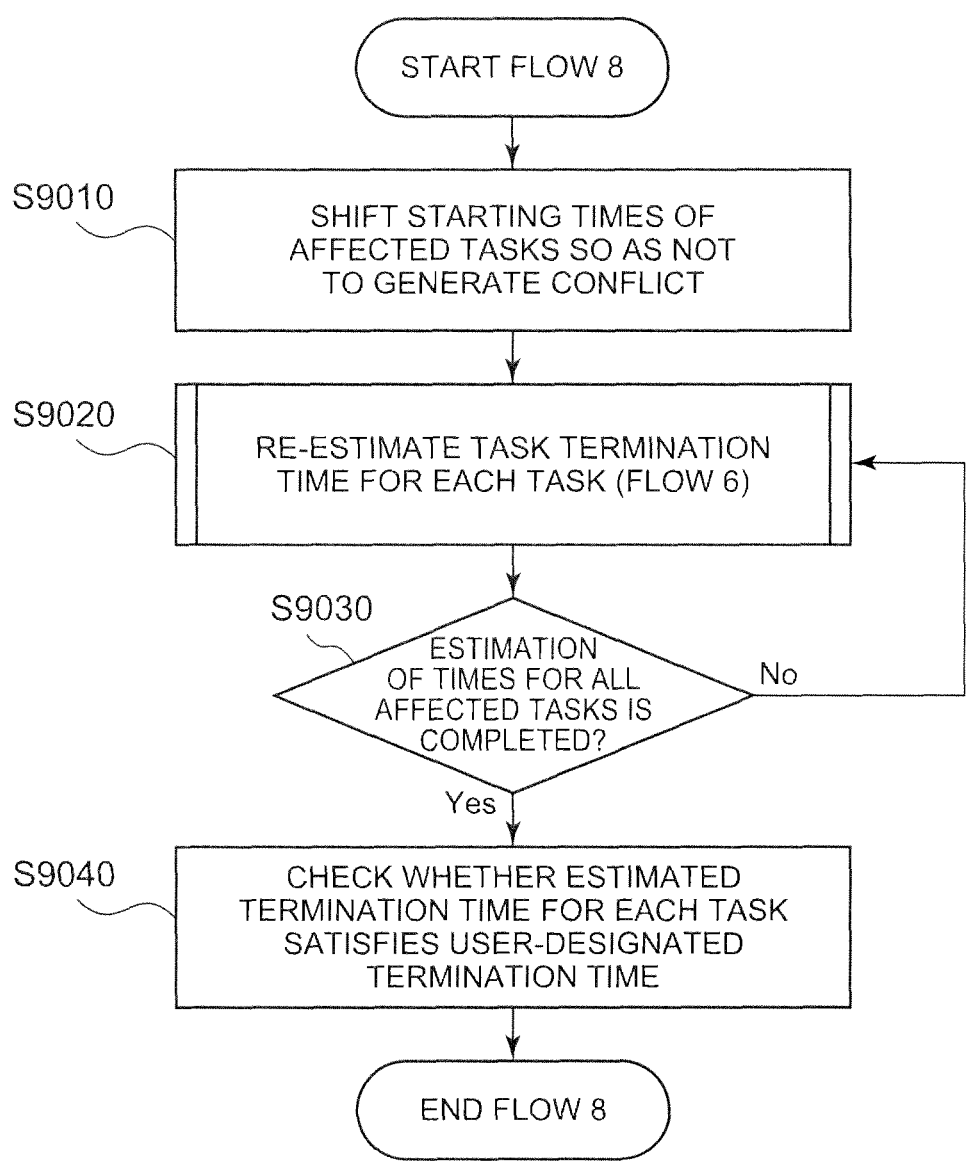
FIG. 31 is a diagram showing a process for virtually switching the order of the tasks according to the first embodiment.

(S3110) In response to the result of flow 8 shown in FIG. 31, a process for changing the task starting time by switching the order of the tasks is executed. The detail of this step is described in flow 9 shown in FIG. 32.

(S3120) As a result of changing the time for each task, each task execution time satisfies the task termination time scheduled by the administrator. Therefore, the task registration process is completed.

(S3130) The administrator is notified of the fact that each task execution time does not satisfy the task termination time scheduled by the administrator even when the time for each task is changed. Note that examples of the method for notifying the administrator of this fact include a method for outputting such notification to the display device of the management computer 5000 or the input/output device 6000, and a method for sending such notification via electronic mail.

Outputting to the display device or the like is performed not only when each task execution time does not satisfy the task termination time scheduled by the administrator but also when, for example, outputting each task execution time estimated in S3060 or S3070 to the display device. Accordingly, the administrator can understand the estimated task execution times and support the storage management work.

Figure 22:
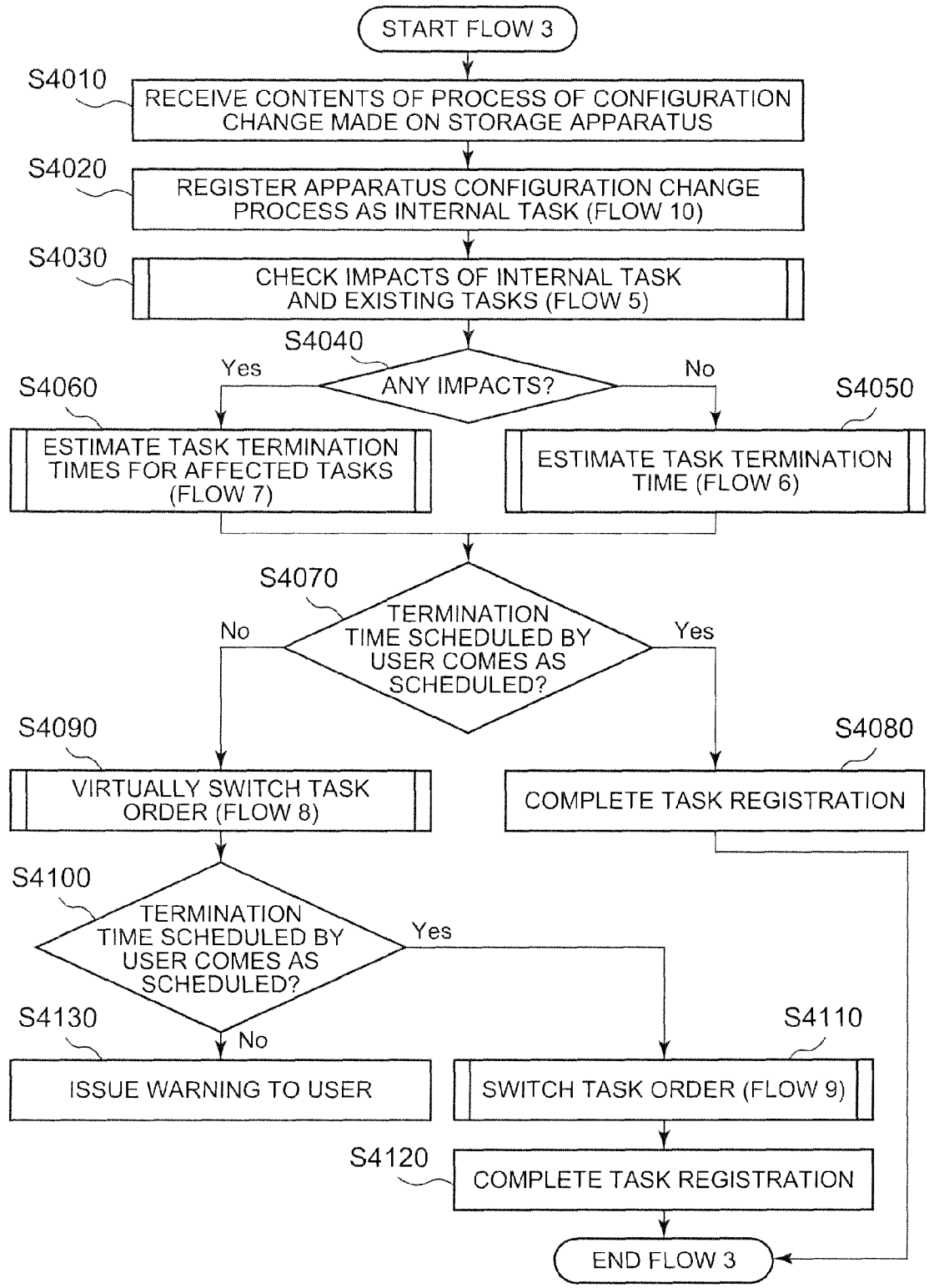
FIG. 22 is a diagram showing a process for changing the configuration of the storage system in the flow of the entire process according to the first embodiment.

FIG. 22 shows a flow of process performed by the management computer 5000 when changing the storage apparatus configuration.

When the configuration of the storage apparatus is changed for reasons of replacing an apparatus having failures and dynamically changing the allocation of the segments in response to the status of an access to the logical volume, the changing operation is treated as an internal process task in the same format as a task set by the administrator. As a result, even when the storage apparatus configuration is changed, the tasks can be managed in consideration of a competition between the configuration changing process and the task designated by the administrator.

Other than the fact that the configuration changing process is treated as the internal process task, the configuration changing process can be realized by the same process as the process shown in FIG. 21 that is carried out upon registration of the tasks. Specific steps are as follows.

(S4010) The system management program 5110 receives contents of the storage apparatus configuration changing process from the configuration management program 1211. Note that, at this point, the storage apparatus configuration changing process is not yet executed.

(S4020) The task management program 5120 defines and registers the apparatus configuration changing process as an internal task in the task management table 5190. The detail of this step is described in flow 10 shown in FIG. 33.

(S4030) The task management program 5120 checks the impacts of the internal task and the existing tasks. Checking the impacts here means checking whether there are competing resources in the internal task and existing tasks. The detail of this step is described in flow 5 shown in FIG. 24.

(S4040) In S4030 it is determined whether the internal task affects the existing tasks. When the internal task does not affect the existing tasks, the process proceeds to S4050. When the internal task affects the existing tasks, the process proceeds to S4060.

(S4050) When the internal task does not affect the existing tasks, the time required for executing the internal task is estimated. The detail of this step is described in flow 6 shown in FIG. 25.

(S4060) When the internal task affects the existing tasks in S4040, the information on all of the affected tasks are acquired, and the time required for executing each task is estimated. The detail of this step is described in flow 7 shown in FIG. 30.

(S4070) Whether or not the task execution time estimated in S4050 or S4060 satisfies the task termination time scheduled by the administrator is checked. When the execution time satisfies the task termination time, the process proceeds to S4080. When the execution time does not satisfy the task termination time, the process proceeds to S4090.

(S4080) Because the time for executing the internal task satisfies the other tasks set by the administrator, the task registration process is completed.

(S4090) The order of the tasks or the starting time of each task is changed to achieve improvement so that the task termination time scheduled by the administrator can be satisfied. The detail of this step is described in flow 8 shown in FIG. 31.

(S4100) Whether the task termination time scheduled by the administrator is satisfied or not is checked as a result of changing the order of the tasks and the starting time of each task. When the task termination time scheduled by the administrator is satisfied, the process proceeds to S4110. When the task termination time is not satisfied, the process proceeds to S4130.

(S4110) In response to the result of flow 8 shown in FIG. 31, a process for changing the task starting time by switching the order of the tasks is executed. The detail of this step is described in flow 9 shown in FIG. 32.

(S4120) As a result of changing the time for each task, each task execution time satisfies the task termination time scheduled by the administrator. Therefore, the task registration process is completed.

(S4130) The administrator is notified of the fact that each task execution time does not satisfy the task termination time scheduled by the administrator even when the time for each task is changed. Note that examples of the method for notifying the administrator of this fact include a method for outputting such notification to the display device of the management computer 5000 or the input/output device 6000, and a method for sending such notification via electronic mail.

Figure 23:
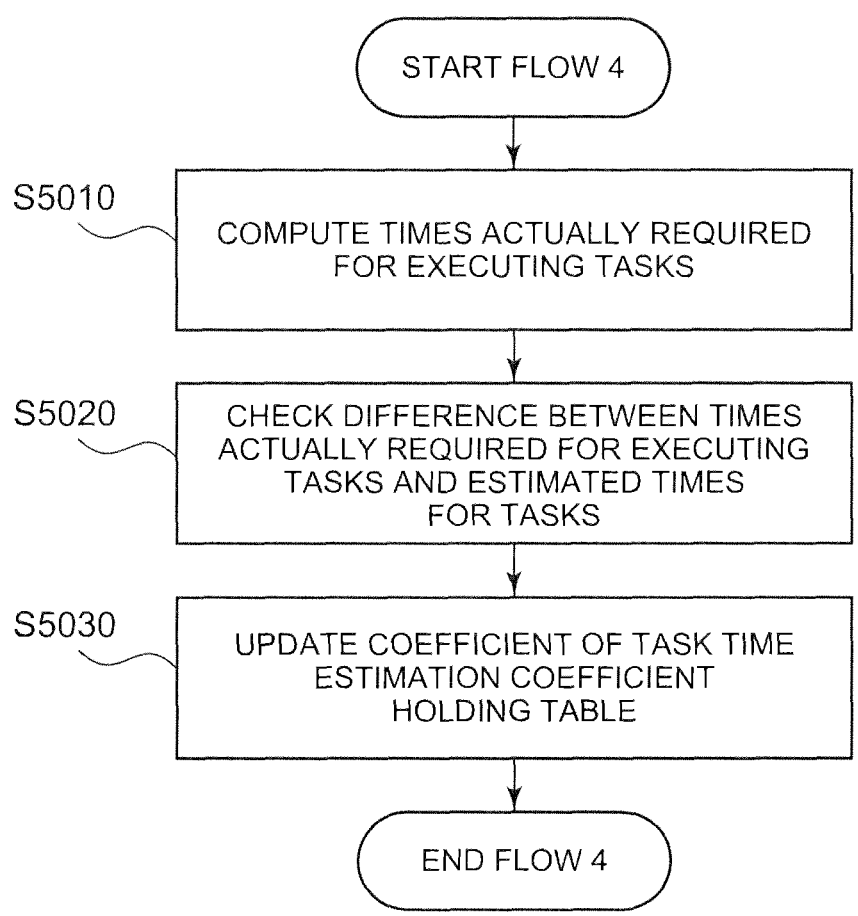
FIG. 23 is a diagram showing a process performed after a task execution, the process being a part of the flow of the entire process according to the first embodiment.

FIG. 23 shows a flow of process performed by the storage management computer 5000 after the execution of the tasks. Specific steps of this process are as follows.

(S5010) The task management program 5120 computes an actual time required for executing each task.

(S5020) The task management program 5120 checks the difference between the actual time required for executing each task and each estimated task execution time, to obtain the ratio therebetween.

(S5030) The task management program 5120 updates the coefficient of the task time estimation coefficient holding table 5140, to a number obtained by multiplying the ratio of the difference by the ratio of a time during which the processes conflict. In other words, in the case where the actual time required for executing each task is four hours, where the estimated time for executing each task as three hours, where the processes conflict for two hours during the four-hour task execution due to the load from another task or host, and where the coefficient of the task estimation coefficient holding table 5140 is 2.0, the estimated two hours during which the processes conflict is actually three hours. In this case, the coefficient 2.0 is multiplied by the actual time ratio 3/2=1.5, and updated as a value 3.0. This value 3.0 is used for subsequently estimating the task time.

Figure 24:
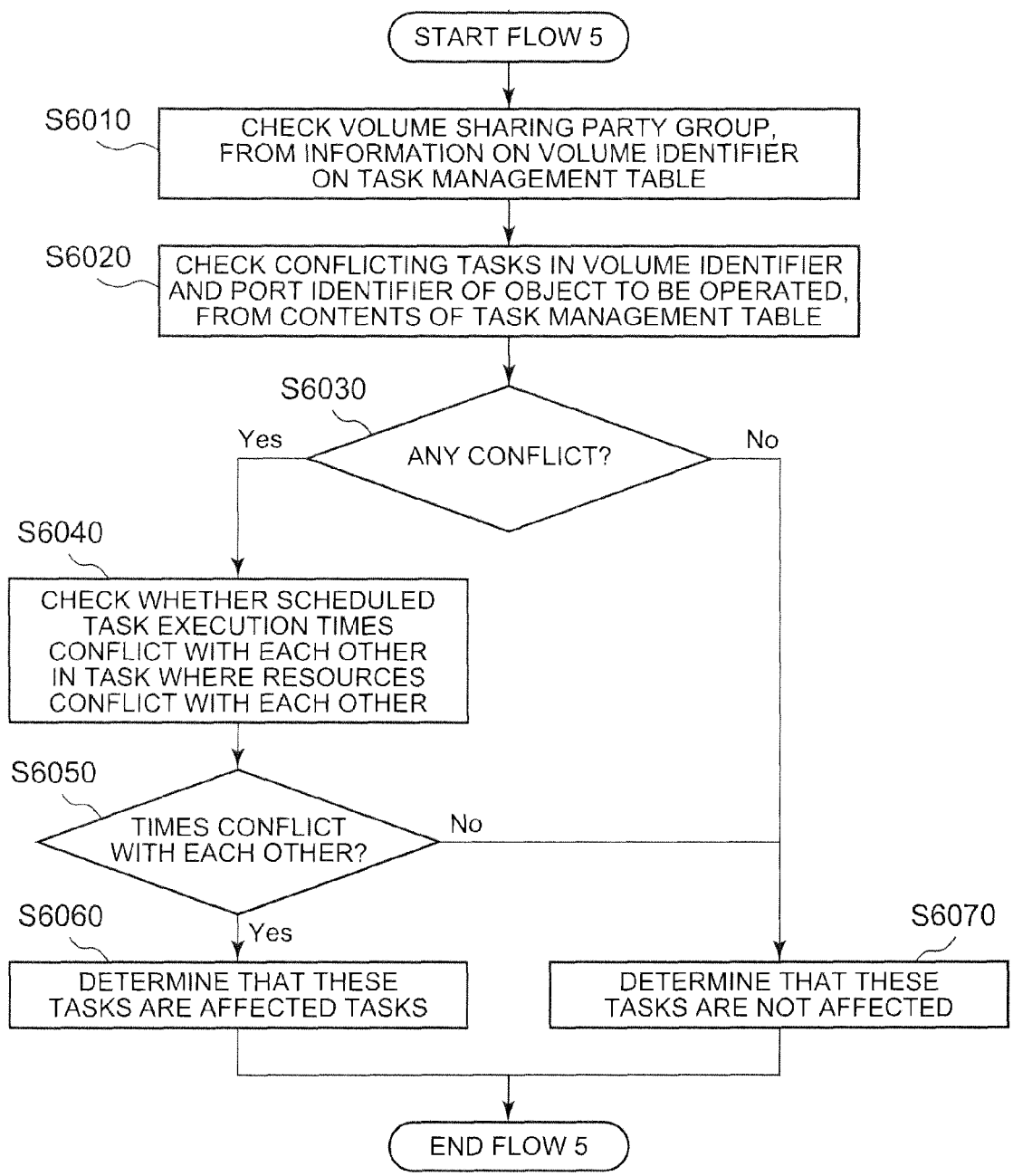
FIG. 24 is a diagram showing a process for confirming whether the task registered in the flow shown in FIG. 21 or FIG. 22 of the first embodiment has an impact on the other tasks.

FIG. 24 shows a process for checking whether the task registered in the flow shown in FIG. 21 or FIG. 22 affects the other tasks. Specific steps of this process are as follows.

(S6010) The task management program 5120 checks the volume (51510) sharing the physical resource or virtual resource in the volume management table, based on the information on the volume identifiers (51904, 51905) described in the task management table 5190.

(S6020) The task management program 5120 checks conflicting tasks in the volume identifiers (51904, 51905, as well as 51510 acquired in the previous step) to be operated and the port identifiers (51906, 51907), from the contents of the task management table 5190.

(S6030) The task management program 5120 determines the presence/absence of conflicting tasks in the resources to be operated. When the conflicting tasks exist, the process proceeds to S6040. When the conflicting tasks do not exist, the process proceeds to S6070.

(S6040) The task management program 5120 checks the presence of a task in which the resources and scheduled task execution times conflict.

(S6050) When there is a task in which the task execution times conflict, the process proceeds to S6060. When there is no such tasks, the process proceeds to S6070.

(S6060) It is determined that each task is affected, and accordingly this flow is completed.

(S6070) It is determined that each task is not affected, and accordingly this flow is completed.

Figure 25:
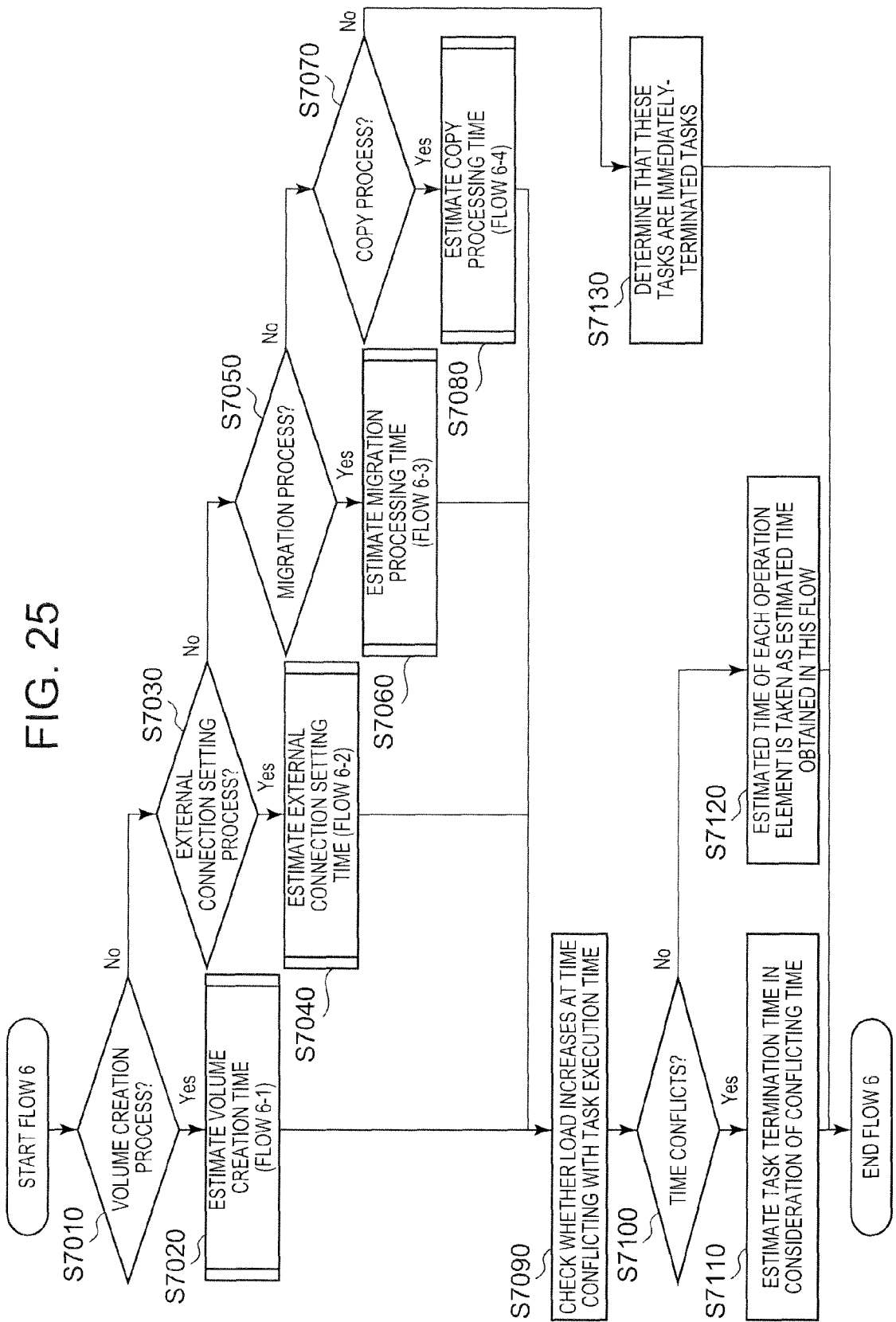
FIG. 25 is a diagram showing a process for estimating a processing time required when resources do not compete with one another in each task according to the first embodiment.

FIG. 25 shows a process in which the storage management computer 5000 estimates a processing time during which the resources do not compete with one another in each task. Specific steps of this process are as follows.

(S7010) Whether the contents of an operation executed in each task correspond to a volume creation process or not is checked. When the contents correspond to the volume creation process, the process proceeds to S7020. When the contents do not correspond to the volume creation process, the process proceeds to S7030.

(S7020) The task management program 5120 estimates a time required for the volume creation. The detail of this step is described in flow 6-1 shown in FIG. 26.

(S7030) Whether the contents of the operation executed in each task correspond to the external connection setting process or not is checked. When the contents correspond to the external connection setting process, the process proceeds to S7040. When the contents do not correspond to the external connection setting process, the process proceeds to S7050.

(S7040) The task management program 5120 estimates a time required for the external connection setting. The detail of this step is described in flow 6-2 shown in FIG. 27.

(S7050) Whether the contents of the operation executed in each task corresponds to a volume migration process or not is checked. When the contents correspond to the volume migration process, the process proceeds to S7060. When the contents do not correspond to the volume migration process, the process proceeds to S7070.

(S7060) The task management program 5120 estimates a time required for the volume migration. The detail of this step is described in flow 6-3 shown in FIG. 28.

(S7070) Whether the contents of the operation executed in each task correspond to a copy process or not is checked. When the contents correspond to the copy process, the process proceeds to S7080. When the contents do not correspond to the copy process, the process proceeds to S7130.

(S7080) The task management program 5120 estimates a time required for the copy process. The detail of this step is described in flow 6-4 shown in FIG. 29.

(S7090) The task management program 5120 checks, using the management-side performance information management table 5180, whether the load increases at the time conflicting with each task execution time.

(S7100) When the times conflict, the process proceeds to S7110. When the times don't conflict, the process proceeds to S7120.

(S7110) The task management program 5120 acquires, from the task time estimation coefficient holding table 5140, coefficient of the conflicting resources and the values of the average IOPS and maximum IOPS of the management-side performance information management table 5180, multiplies the coefficient by the ratio between the average IOPS and the maximum IOPS to obtain the estimated time, for the time of each operation element during which the task execution time conflicts with the time during which an increase of the load is expected.

For example, as illustrated in FIG. 34, in the case where the estimated time for executing an operation element of one task (task 1) is between 5:00 to 8:00 (three hours), where the time during which an increase of the load is estimated is from 7:00 to 8:00, where the coefficient of the task time estimation coefficient holding table 5140 is 1.5, and where the average IPOS is 100 and the maximum IPOS 200, 0.5 of the coefficient 1.5 is multiplied by the ratio between the average IOPS and the maximum IPOS. In other words, 1+(0.5×100/200)=1.25 is obtained as a new coefficient. In addition, because the task execution estimated time and the time during which the increase of the load is estimated conflict for one hour, the time between 5:00 and 7:00 is left as it is, but the one hour between 7:00 and 8:00 is multiplied by 1.25, which means that the estimated time is 1.25 hours. Consequently, it is estimated to take a total of 3.25 hours for the execution. This time is obtained as the estimated time in this flow.

(S7120) The estimated time for each operation element is taken as the estimated time in this flow.

(S7130) The task is determined as an immediately-terminated task, based on the contents of the operation, and the estimated time required for the task is 0.

Figure 26:
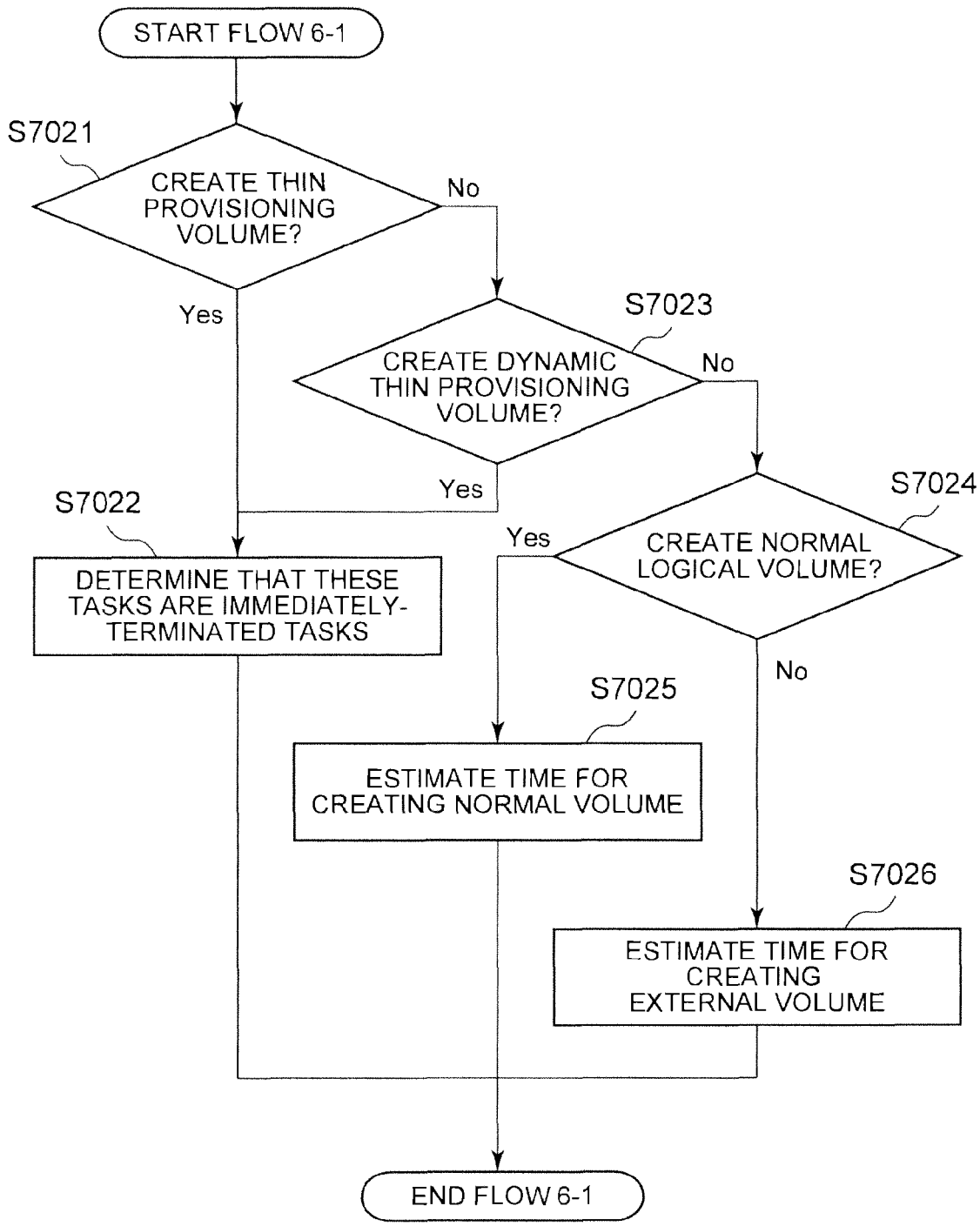
FIG. 26 is a diagram showing a process for estimating a time required for a volume creation process according to the first embodiment.

FIG. 26 shows a process in which the storage management computer 5000 estimates the time required for the volume creation process. Specific steps of this process are as follows. Note that when the storage apparatus supports neither the thin provisioning function nor the dynamic thin provisioning function, the steps S7021 and S7023 are not necessary.

(S7021) Whether a volume to be created is the thin provisioning volume or not is checked. When the volume to be created is the thin provisioning volume, the process proceeds to S7022. When the volume to be created is not the thin provisioning volume, the process proceeds to S7023.

(S7022) Because this task does not actually require the process for creating a volume, the task is determined as the immediately-terminated task and the time required for the task is determined as 0.

(S7023) Whether the volume to be created is the dynamic thin provisioning volume or not is checked. When the volume to be created is the dynamic thin provisioning volume, the process proceeds to S7022. When the volume to be created is not the dynamic thin provisioning volume, the process proceeds to S7024.

(S7024) Whether the volume to be created is the normal logical volume or not is checked. When the volume to be created is the normal logical volume, the process proceeds to S7025. When the volume to be created is not the normal logical volume, the process proceeds to S7026.

(S7025) The task management program 5120 acquires, from the unit process required time table 5130, the time required for creating the normal logical volume, multiplies the time by the size of the volume to be created, to obtain the estimated time required for creating the volume. For example, in the case where the unit process required time table 5130 describes that it takes 10 seconds to create 1-GB volume, and the size of the volume to be created is 2 GB, the estimated time is determined as 20 seconds, and this flow is completed.

(S7026) The task management program 5120 acquires, from the unit process required time table 5130, the time required for creating the external volume, multiples the time by the size of this volume, to obtain the estimated time required for creating this volume. Subsequently, this flow is completed.

Figure 27:
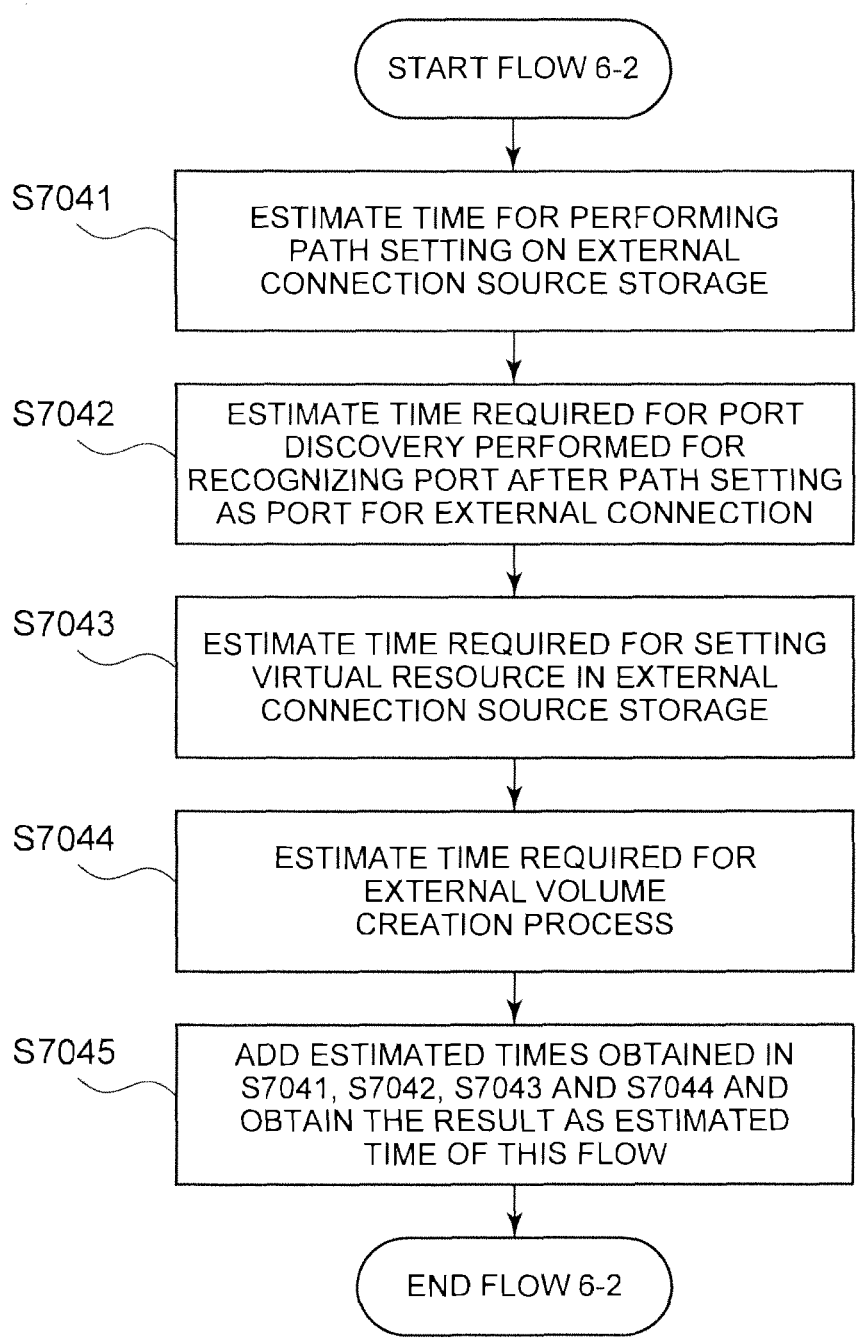
FIG. 27 is a diagram showing a process for estimating a time required for an external connection setting process according to the first embodiment.

FIG. 27 shows a process in which the storage management computer 5000 estimates the time required for the external connection setting process. The processes that are necessary in the external connection setting are as follows. In other words, there are four required processes: allocating the path of the logical volume of the external connection destination storage apparatus to the external connection source storage apparatus, port discovery for checking the information on a port in which the path from the logical volume of the external connection storage apparatus is set, creating a virtual resource in the external connection source storage apparatus, and creating the external volume in the created virtual resource. The time required for carrying out these processes is obtained as an estimated time required for this flow. Specific steps are as follows.

(S7041) The task management program 5120 estimates, based on path allocation times on the unit required time table 5130, a time required for setting a path of the external volume into the external connection source storage apparatus.

(S7042) The task management program 5120 estimates, based on port discovery times on the unit process required time table 5130, a time required for carrying out the port discovery process, which is required for recognizing the port obtained after the path setting, as an external connection port.

(S7043) The task management program 5120 estimates, based on virtual resource times on the unit process required time table 5130, a time required for setting a virtual resource in the external connection source storage apparatus.

(S7044) The task management program 5120 estimates a time required for the external volume creation process, based on external volume creation times on the unit process required time table 5130.

(S7045) The task management program 5120 takes the time obtained by adding the estimated times obtained in 57041, 57042, 57043 and 57044, as the estimated time of this flow.

Figure 28:
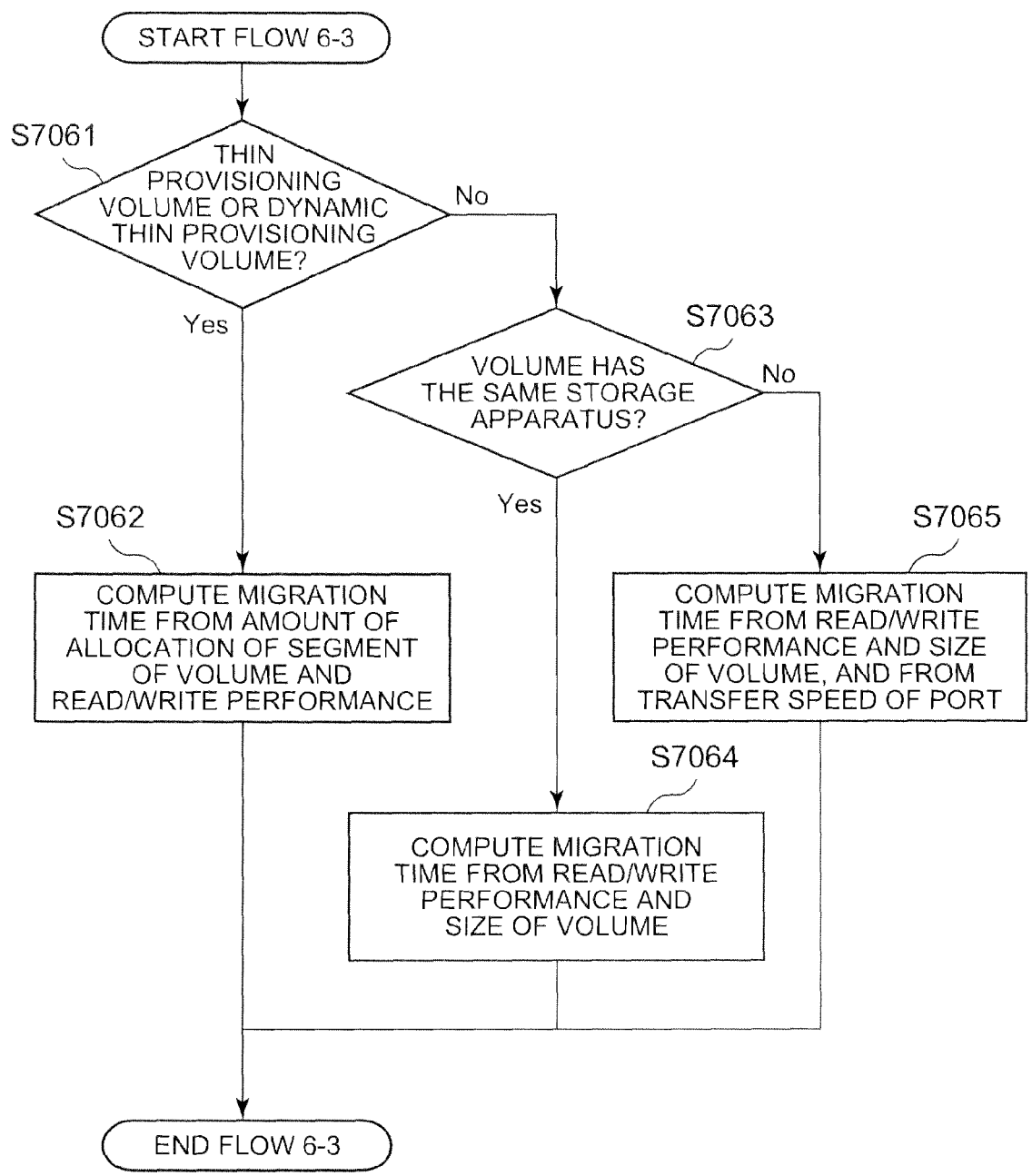
FIG. 28 is a diagram showing a process for estimating a time required for a data migration process according to the first embodiment.

FIG. 28 shows a process in which the storage management computer 5000 estimates a time required for the data migration process. Specific steps of this process are as follows. Note that when the storage apparatus supports neither the thin provisioning function nor the dynamic thin provisioning function, the step S7061 is not necessary.

(S7061) The task management program 5120 checks whether the migration source volume is the thin provisioning volume or the dynamic thin provisioning volume. When the migration source volume is either one of the volumes, the process proceeds to S7062. When the migration source volume is neither one of the volumes, the process proceeds go S7063.

(S7062) The task management program 5120 uses the disk type performance information table 5170 and the management-side physical/logical storage area correspondence table 5160 to compute a migration time from the read/write performance and volume size per unit time of the migration source volume or migration destination volume, and obtains the computed migration time as the estimated time. For example, suppose that an FC internal has 10 GB, SATA internal has 10 GB, and FC external has 20 GB. When the read/write performance of each storage is 10 G/sec and 5 G/sec, 8 G/sec and 4 G/sec, and 3 G/sec and 1 G/sec, 10×10+10×5+10×8+10×4+20×3+20×1=350 sec is obtained as the task estimated time.

(S7063) The task management program 5120 checks whether the migration source volume and migration destination volume have the same storage apparatus. When the migration source volume and migration destination volume have the same storage apparatus, the process proceeds to S7064. When the migration source volume and migration destination volume do not have the same storage apparatus, the process proceeds to S7065.

(S7064) The task management program 5120 acquires a read/write time per unit time of the migration source volume or migration destination volume, from the disk type performance information table 5170 and the volume management table 5150, and computes the migration time from the volume size to obtain the estimated time. For example, suppose that the volume size 10 GB, the type is FC internal, and the read/write performance is 10 G/sec and 5 G/sec. The result of 10×10+10×5=150 sec is obtained as the task estimated time.

(S7065) The task management program 5120 acquires the read/write time per unit time of the migration source volume or migration destination volume, from the disk type performance information table 5170 and the volume management table 5150, and computes the migration time from the volume size and transfer speed of the port, to obtain the estimated time. For example, suppose that the migration source volume is of FC internal and has 10 GB and 10 G/sec read performance, whereas the migration destination volume is of SATA internal and has a port transfer speed of 4 Gbps and 4 G/sec write performance. The result of 10×10+10×4=140 is obtained the time required for data writing, and 10×4/8=5 (bit is converted to byte) is obtained as the estimated time required for transferring data. A total of 145 seconds is obtained as the task estimated time.

Figure 29:
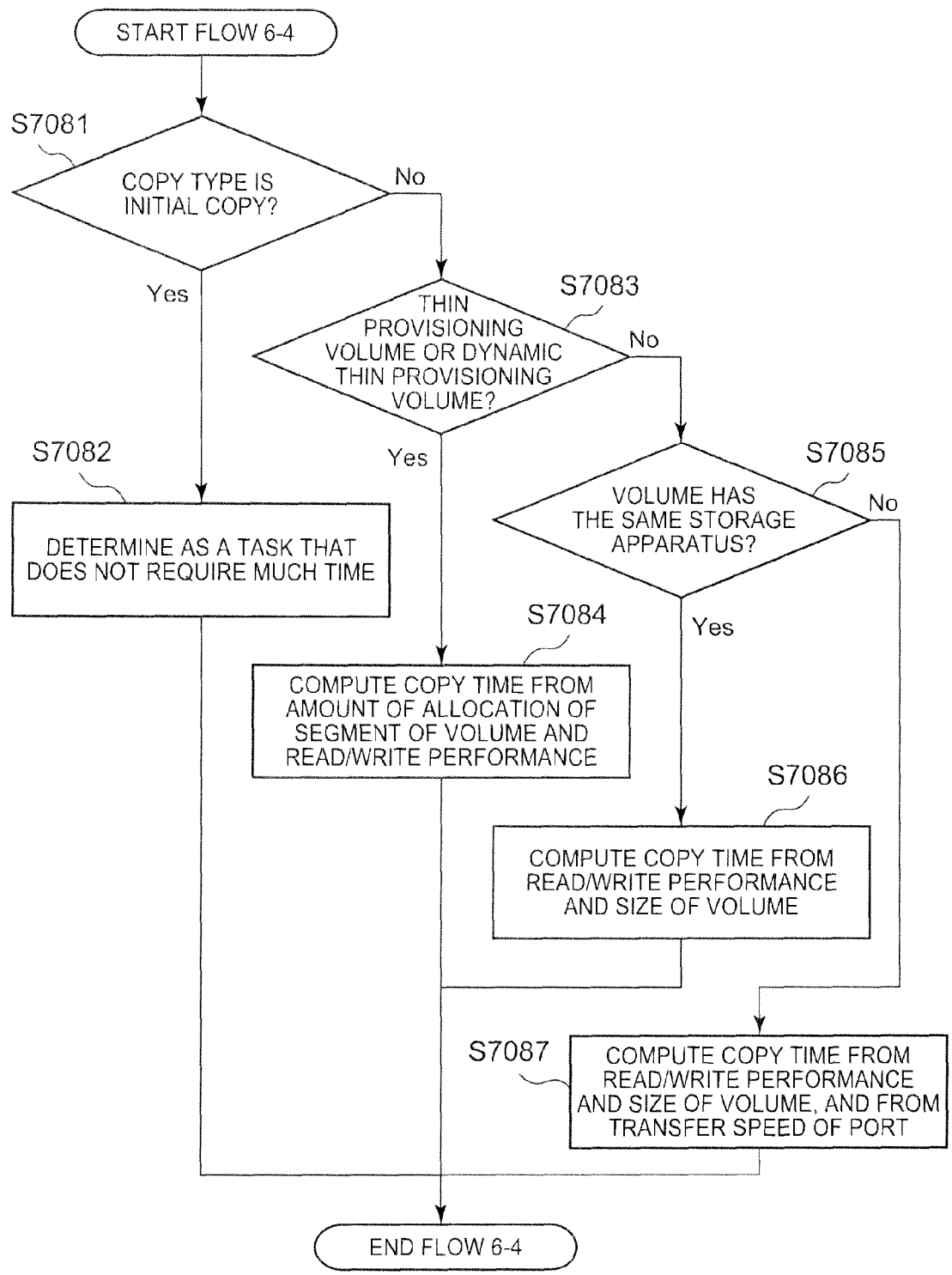
FIG. 29 is a diagram showing a process for estimating a time required for a copy processing according to a first embodiment.

FIG. 29 shows a process in which the storage management computer 5000 estimates the time required for the copy process. Specific steps of this process are as follows.

(S7081) The task management program 5120 checks whether the copy type is initial copy or not. When the copy type is not initial copy, the process proceeds to S7082. When the copy type is initial copy, the process proceeds to S7083.

(S7082) Because the difference amount is copied in this task, it is determined that this task does not require a long time, and consequently it is determined that the time required for this task is 0.

(S7083) The task management program 5120 checks whether a copy source volume is the thin provisioning volume or the dynamic thin provisioning volume. When the copy source volume is either one of the volumes, the process proceeds to S7084. When the copy source volume is neither one of the volumes, the process proceeds to S7085.

(S7084) The task management program 5120 uses the disk type performance information table 5170 and the management-side physical/logical storage area correspondence table 5160 to compute a copy time from the read/write performance and volume size per unit time of the copy source volume or copy destination volume, and obtains the computed copy time as the estimated time. The computation method is same as that described in S7062.

(S7085) The task management program 5120 checks whether the copy source volume or copy destination volume has the same storage apparatus. When the copy source volume or copy destination volume has the same storage apparatus, the process proceeds to S7086. When the copy source volume or copy destination volume does not have the same storage apparatus, the process proceeds to S7087.

(S7086) The task management program 5120 acquires a read/write time per unit time of the copy source volume or copy destination volume, from the disk type performance information table 5170 and the volume management table 5150, and computes the copy time from the volume size to obtain the estimated time. The computation method is same as that described in S7064.

(S7087) The task management program 5120 acquires the read/write time per unit time of the copy source volume or copy destination volume, from the disk type performance information table 5170 and the volume management table 5150, and computes the copy time from the volume size and transfer speed of the port, to obtain the estimated time. The computation method is same as that described in S7065.

Figure 30:
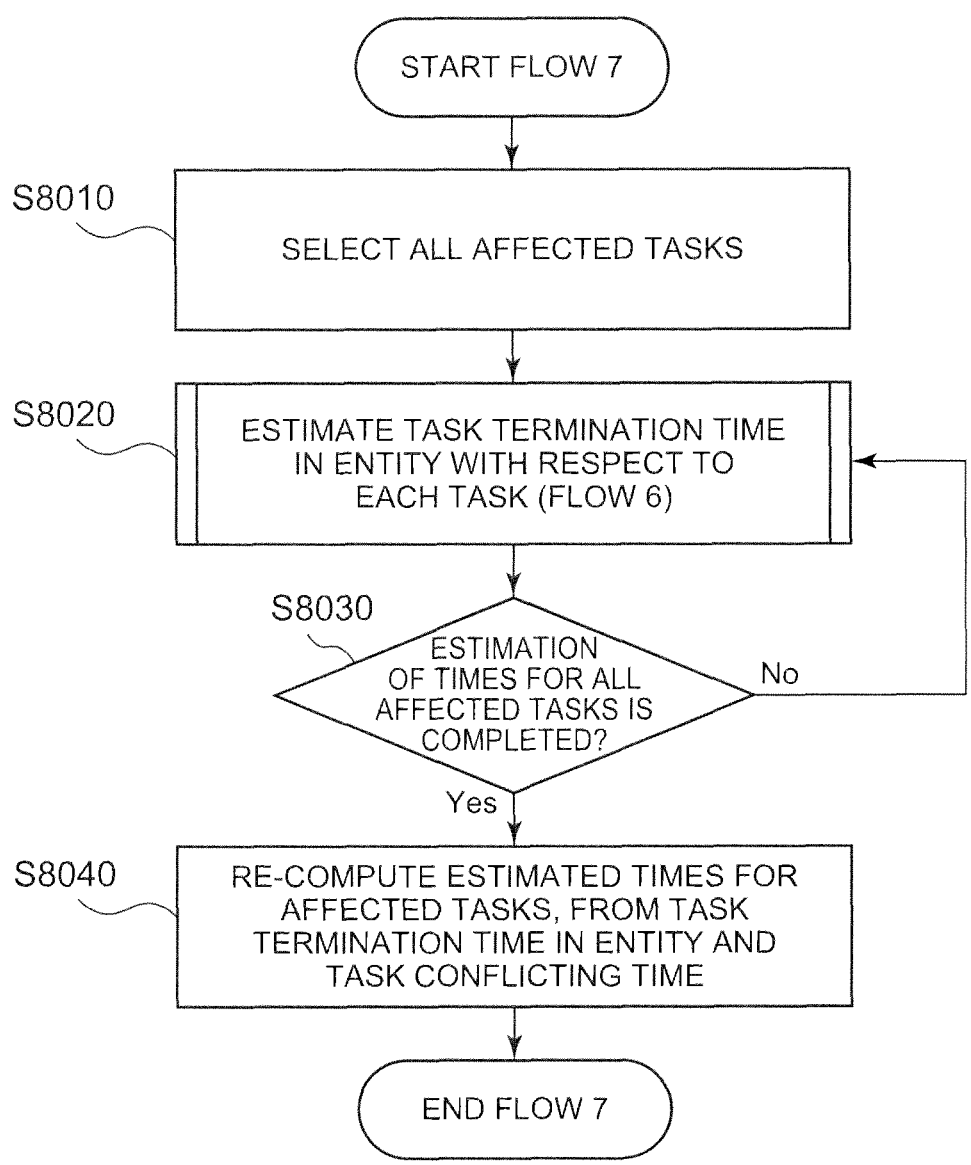
FIG. 30 is a diagram showing a process for estimating a processing time required when the resources compete with one another in each task according to the first embodiment.

FIG. 30 shows a process in which the storage management computer 5000 estimates a processing time obtained when each task has the competing resources. Specific steps of this process are as follows.

(S8010) The task management program 5120 selects all of the affected tasks from the task management table 5190 to acquire the information on these tasks.

(S8020) The task management program 5120 estimates a task termination time with respect to each task. First, the task termination time is estimated when the process is supposedly a single process for each task. This process uses the same process of flow 6 shown in FIG. 25.

(S8030) The task management program 5120 checks whether the estimation of the times for all of the affected tasks is completed. When the estimation is completed, the process proceeds to S8040. When the estimation is not completed, the process returns to S8020.

(S8040) The task management program 5120 acquires the coefficient from the task time estimation coefficient holding table 5140, and obtains the estimated time by multiplying the coefficient and the time conflicting with the task execution time by an estimated execution time, and adding the obtained result to a time that does not conflict with the multiplied time. For example, as shown in FIG.

34, suppose that there is a process where the execution estimated time of one task (task 1) is between 5:00 and 8:00 (three hours), and where another task (task 2), the external connection I/F and the host I/F 2 compete with one another from 6:00 to 8:00. Also, suppose that the execution estimated time of the task 2 is between 6:00 and 9:00 (three hours). In addition, suppose that the coefficient of the external connection I/F is 1.5 and the coefficient of the host I/F 2 is 1.3 in the task time estimation coefficient holding table 5140. Since the time conflicts by two hours in actuality, these two hours are estimated to be 2×1.5× 1.3=3.9 hours. In other words, it is estimated that the task 1 requires a total of 4.9 hours to be processed and that the task 2 also requires 4.9 hours to be processed. Note that, as shown in S7130 in FIG. 25, the termination time of the task 1 is corrected prior to this step, in consideration of the IOPS received from the host computer. However, for the purpose of simplification of this step, the estimated required time for the task 1 is three hours.

FIG. 31 shows a process in which the storage management computer 5000 supposedly switches the order of the tasks for changing each task starting time, for example. Specific steps of this process are as follows.

(S9010) The task management program 5120 uses the termination times and estimated times of the affected tasks to shift any of the task starting times so as not to generate a conflict. When a user input task conflicts with an internal task generated by changing the configuration within the storage apparatus, the user input task is determined as having a higher priority, and the internal task generated by changing the configuration of the storage apparatus is moved backward.

(S9020) The task management program 5120 re-estimates the task termination time for each task. Here, the task termination time is estimated when the process is supposedly a single process for each task. This process uses the same process of flow 6 shown in FIG. 25.

(S9030) The task management program 5120 checks whether the estimation of the times for all of the affected tasks is completed. When the estimation is completed, the process proceeds to S9040. When the estimation is not completed, the process returns to S9020.

(S9040) The task management program 5120 checks whether the estimated termination time for each task satisfies the user designated termination time 51910 on the task management table 5190.

Figure 32:
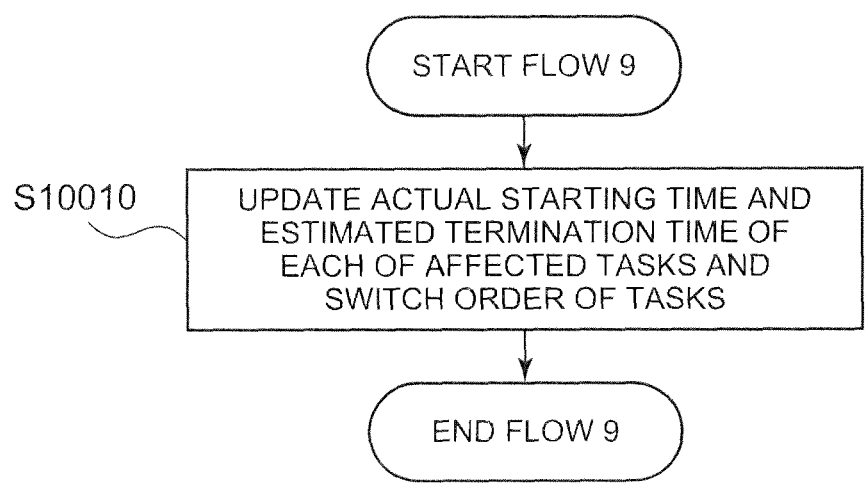
FIG. 32 is a diagram showing a process for actually switching the order of the tasks according to the first embodiment.

FIG. 32 shows a process for actually switching the order of the tasks. A specific step of this process is as follows.

(S10010) The task management program 5120 updates the actual starting time 51909 and estimated termination time 51911 on the task management table 5190, to change the order of the tasks.

Figure 33:
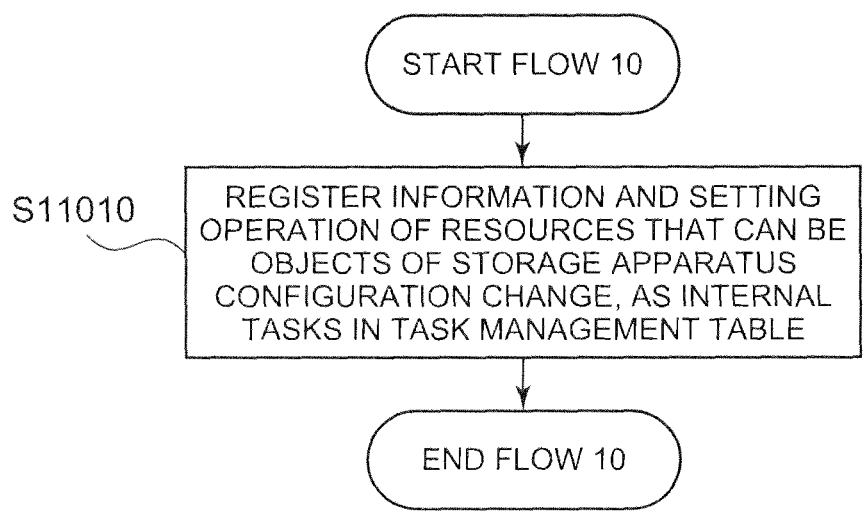
FIG. 33 is a diagram showing a process for registering a process within the storage system of the first embodiment, as an internal task.

FIG. 33 shows a process for registering a process within the storage apparatus as the internal task. A specific step of this process is as follows.

(S11010) The task management program 5120 registers, as the internal task, the information on the resources subjected to configuration change, as well as the operation of setting the resources, into the task management table 5190. The user designated starting time 51908 and user designated termination time 51910 are not set, but the actual starting time 51909 is taken as the registration time.

According to the first embodiment described above, when asynchronously executing the plurality of tasks having registered therein the volume creation, external connection setting, data migration, copy process and other storage operations requiring some time to be executed, future load from the host computer is estimated, a dynamic configuration change of the storage apparatus is received, times required for executing the appropriate tasks are estimated, and the order of executing the tasks and the starting time for each task are changed. Because the data migration process and the process for creating a large volume require a considerable amount of time, and the physical resources or ports compete with one another according to the configuration of the storage system, asynchronous execution of these processes by using the tasks can solve the problem of requiring excessive time for executing the tasks, and improve the precision of estimating the task execution times. Moreover, checking the presence/absence of a conflict between plan execution times and a competition between the resources prior to the execution of the tasks can increase the possibility that the tasks are completed as scheduled, as a result of the configuration change generated upon execution of the tasks. In addition, even when the configuration of the storage is changed, the tasks can be managed appropriately in consideration of the configuration change.

(3) System Configuration According to a Second Embodiment

A second embodiment is described next. The second embodiment is different than the first embodiment only in a partial process operation, and thus the explanation of the system setting of the second embodiment is omitted.

(4) Operations According to the Second Embodiment

Operations of the second embodiment are described. Unlike the first embodiment, in the second embodiment, instead of receiving storage apparatus configuration change notification from the storage apparatus, the management computer updates the contents of the registered tasks accordingly by periodically checking the contents of the configuration change. Since the difference with the first embodiment is understanding the configuration of the storage apparatus (same as flow 3 shown in FIG. 22 of the first embodiment), only this difference is described.

Figure 37:
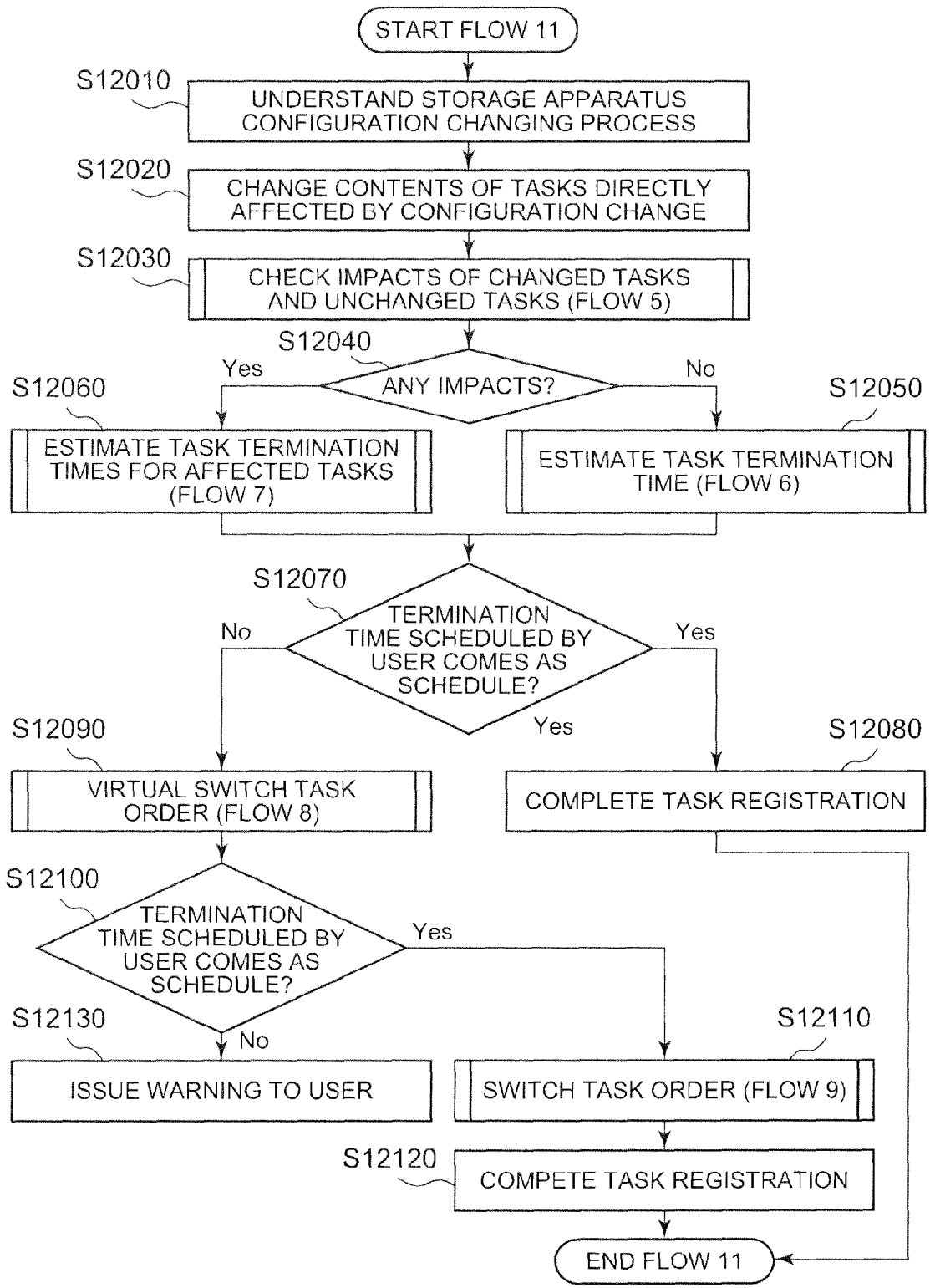
FIG. 37 is a diagram showing a process performed when storage system configuration change information is acquired, the process being a part of a flow of the entire process according to a second embodiment.

FIG. 37 shows a flow of process performed by the storage management computer 5000 when the storage apparatus configuration change according to the second embodiment is made. Specific steps of this process are as follows.

(S12010) The system management program 5110 regularly inquires for the configuration information of the storage apparatus 1000 (the configuration information of the logical volume and the information on the connection between the storage apparatuses) from the configuration management program 1211.

(S12020) The task management program 5120 updates the task management table 5190 using the information acquired in S12010.

(S12030) The task management program 5120 checks the impacts of the tasks with updated contents and the tasks that are not updated. Checking the impacts here means checking whether there competing resources in the updated tasks and the tasks that are not updated. The detail of this step is described in flow 5 shown in FIG. 24.

(S12040) It is determined in S12030 whether the updated tasks affect the tasks that are not updated. When the updated tasks do not affect the tasks that are not updated, the process proceeds to S12050. When the updated tasks affect the tasks that are not updated, the process proceeds to S12060.

(S12050) When the updated tasks do not affect the tasks that are not updated, the time required for executing the updated tasks is estimated. The detail of this step is described in flow 6 shown in FIG. 25.

(S12060) When the updated tasks affect the tasks that are not updated in S12040, information on all of the affected tasks are acquired, and the time required for executing each task is estimated. The detail of this step is described in flow 7 shown in FIG. 30.

(S12070) Whether the task execution time estimated in S12050 or S12060 satisfies the task termination time scheduled by the administrator or not is checked. When the task execution time satisfies the task termination time, the process proceeds to S12080. When the task execution time does not satisfy the task termination time, the process proceeds to S12090.

(S12080) Since each task is executed at the time in which the execution times for the updated tasks do not affect the other tasks set by the administrator, the task registration process is completed.

(S12090) The order of the tasks or the starting time of each task is changed to achieve improvement so that the task termination time scheduled by the administrator can be satisfied. The detail of this step is described in flow 8 shown in FIG. 31.

(S12100) Whether the task termination time scheduled by the administrator is satisfied or not is checked as a result of changing the order of the tasks and the starting time of each task. When the task termination time scheduled by the administrator is satisfied, the process proceeds to S12110. When the task termination time is not satisfied, the process proceeds to S12130.

(S12110) In response to the result of flow 8 shown in FIG. 31, a process for changing the task starting time by switching the order of the tasks is executed. The detail of this step is described in flow 9 shown in FIG. 32.

(S12120) As a result of changing the time for each task, each task execution time satisfies the task termination time scheduled by the administrator. Therefore, the task registration process is completed.

(S12130) The administrator is notified of the fact that each task execution time does not satisfy the task termination time scheduled by the administrator even when the time for each task is changed. Note that examples of the method for notifying the administrator of this fact include a method for outputting such notification to the display device of the management computer 5000, and a method for sending such notification via electronic mail.

According to the second embodiment described above, when asynchronously executing the plurality of tasks having registered therein the volume creation, external connection setting, data migration, copy process and other storage operations requiring some time to be executed, future load from the host computer is estimated, the configuration information of the storage apparatus is checked periodically, times required for executing the appropriate tasks are estimated, and the order of executing the tasks and the starting time for each task are changed. Because the data migration process and the process for creating a large volume require a considerable amount of time, and the physical resources or ports compete with one another according to the configuration of the storage system, asynchronous execution of these processes by using the tasks can solve the problem of requiring excessive time for executing the tasks, and improve the precision of estimating the task execution times. Moreover, checking the presence/absence of a conflict between plan execution times and a competition between the resources prior to the execution of the tasks can increase the possibility that the tasks are completed as scheduled, as a result of the configuration change generated upon execution of the tasks. In addition, even when the configuration of the storage is changed, the tasks can be managed appropriately in consideration of the configuration change.

The present invention is not limited to the embodiments described above and therefore includes various modifications. For example, the aforementioned embodiments are described in detail in order to provide a simple explanation about the present invention, and are not necessarily limited to all of the configurations mentioned above. Some of the configurations of a certain embodiment can be replaced with the configurations of the other embodiments, or the configurations of a certain embodiment can be added to the configurations of the other embodiments. In addition, some of the configurations of each embodiment can be added to, deleted, and/or replaced with the other configurations.

REFERENCE SIGNS LIST

1000 Storage apparatus
1050 Storage system
1100 Disk device
1110 Logical volume
1111 Normal logical volume
1112 External volume
1113 Thin provisioning volume
1114 Dynamic thin provisioning volume
1120 Pool
1200 Disk controller
1210 Main memory
1211 Configuration management program
1212 Storage-side physical/logical storage area correspondence table
1213 Storage-side performance information management table
1214 External volume management table
1220 Controller
1230 Host I/F
1240 Management I/F
1250 Disk I/F
1260 External connection I/F
2000 Host computer
2100 Main memory
2200 Controller
2300 Host I/F
2400 Management I/F
3000 Data network
4000 Management network
5000 Management computer
5100 Main memory
5110 System management program
5120 Task management program
5130 Unit process required time table
5140 Task time estimation coefficient holding table
5150 Volume management table
5160 Management-side physical/logical storage area correspondence table
5170 Disk type performance information table
5180 Management-side performance information management table
5190 Task management table
5200 Controller
5300 Management I/F
6000 Input/output device

The invention claimed is:
1. A computer system, comprising:
a storage apparatus coupled to a host computer via a network; and a storage management computer configured to access the storage apparatus and the host computer, wherein the storage apparatus comprises a storage unit configured to store data read/written by the host computer and is configured to provide the host computer with a storage area of the storage unit as one or more volumes, wherein the storage management computer comprises a first memory configured to store one or more task information each comprising contents of a respective process performed on the storage apparatus, and a scheduled starting time and a scheduled termination time of the respective process, and wherein the one or more task information include a first task information and a second task information, and when resources used in a process of the second task information are the same as resources used in a process of the first task information, the storage management computer is configured to compute times required for executing the first task information and the second task information, wherein the storage management computer is configured to:
acquire contents of a configuration change performed on the storage apparatus;
update contents of at least one of the one or more task information stored in the first memory to obtain updated task information, wherein the at least one of the one or more task information is related to the configuration change;
compute the times required for executing the processes of the first task information and the second task information by using the updated task information as the first task information;
determine that the times required for executing the processes of the first task information and the second task information conflict;
determine that at least one of the processes of the first task information and the second task information is not completed by the scheduled termination time in response to determining that the times required for executing the processes of the first task information and the second task information conflict; and
switch a task order between the process of the first task information and the process of the second task information and change the scheduled starting time of at least one of the process of the first task information or the process of the second task information so that a time for executing the process of the updated task information as the first task information does not conflict with the time for executing the process of the second task information in response to determining that at least one of the processes of the first task information and the second task information is not completed by the scheduled termination time, wherein the storage apparatus further comprises a second memory configured to store an input/output data amount per unit time, which is the amount of data transmitted from the host computer to the one or more volumes, wherein the storage management computer is further configured to acquire the input/output data amount per unit time from the second memory of the storage apparatus, wherein the storage management computer is further configured to determine whether at least part of the resources used in the processes of the first task information and the second task information are the same, on the basis of information on an object to be subjected to the respective process and information on a resource used for accessing the one or more volumes, wherein the first memory is further configured to store performance information of the storage area, the performance information indicating Input Output Per Second (IOPS) of a certain volume, and wherein the storage management computer is further configured to:
compute processing times required for executing contents of the processes of the first task information and the second task information, based on the contents of the processes of the first task information and the second task information, the object to be subjected to the processes of the first task information and the second task information, and the performance information of the storage area, and
add to the processing times a time obtained by multiplying the time during which the processes conflict with each other, by a predetermined coefficient, thereby computing the times required for executing the first task information and the second task information.

2. The computer system according to claim 1,
wherein the storage apparatus coupled to one or more second storage apparatuses via a network, is configured to use volumes of the second storage apparatuses as a storage area of the storage apparatus, and the second memory further stores a relationship between the storage area of the storage apparatus and volumes of the second storage apparatuses,
wherein the contents of the respective process comprise a search process for recognizing path setting and an interface coupled to the network, and a process for creating a volume in the storage apparatus so that the volumes of the second storage apparatuses are capable of being used as the storage area of the storage apparatus.

3. The computer system according to claim 2,
wherein the one or more task information further comprise the information on the object to be subjected to the respective process, and
wherein the first memory is further configured to store the information on the resource used for accessing the one or more volumes.

4. The computer system according to claim 3,
wherein the storage management computer is further configured to:
compute the times required for executing the processes of the first task information and the second task information, by taking the acquired contents of the configuration change as the first task information, wherein the process of the first task information is started immediately; and
change the scheduled starting time so that a time for executing the process of the acquired contents of the configuration change as the first task information does not conflict with a time for executing the process of the second task information, when at least one of the processes of the first task information and the second task information is not completed by the scheduled termination time as a result of the computation of the times required for executing the first task information and the second task information.

5. The computer system according to claim 3, wherein the contents of the processes of the first task information and the second task information comprise either a process for migrating or copying data stored in the volume from the volume to another volume, or a process for creating a volume from the storage area.

6. A storage management computer which is configured to access a storage apparatus that provides a host computer with a storage area of a storage unit as one or more volumes, the storage unit storing data read/written by the host computer, and the host computer, comprising:
  a first memory configured to store one or more task information each comprising contents of a respective process performed on the storage apparatus, and a scheduled starting time and a scheduled termination time of the respective process,
  wherein the one or more task information include a first task information and a second task information, and when resources used in a process of the second task information are the same as resources used in a process of the first task information, the storage management computer is configured to compute times required for executing the first task information and the second task information,
  wherein the storage management computer is configured to:
    acquire contents of a configuration change performed on the storage apparatus;
    update contents of at least one of the one or more task information stored in the first memory to obtain updated task information, wherein the at least one of the one or more task information is related to the configuration change;
    compute the times required for executing the processes of the first task information and the second task information by using the updated task information as the first task information;
    determine that the times required for executing the processes of the first task information and the second task information conflict;
    determine that at least one of the processes of the first task information and the second task information is not completed by the scheduled termination time in response to determining that the times required for executing the processes of the first task information and the second task information conflict; and
    switch a task order between the process of the first task information and the process of the second task information and change the scheduled starting time of at least one of the process of the first task information or the process of the second task information so that a time for executing the process of the updated task information as the first task information does not conflict with a time for executing the process of the second task information in response to determining that at least one of the processes of the first task information and the second task information is not completed by the scheduled termination time,
  wherein the storage apparatus further comprises a second memory configured to store an input/output data amount per unit time, which is the amount of data transmitted from the host computer to the one or more volumes, and
  wherein the storage management computer is further configured to acquire the input/output data amount per unit time from the second memory of the storage apparatus,
  wherein the storage management computer is further configured to determine whether at least part of the resources used in the processes of the first task information and the second task information are the same, on the basis of information on an object to be subjected to the respective process and information on a resource used for accessing the one or more volumes,
  wherein the first memory is further configured to store performance information of the storage area, the performance information indicating Input Output Per Second (IOPS) of a certain volume, and
  wherein the storage management computer is further configured to:
    compute processing times required for executing contents of the processes of the first task information and the second task information, based on the contents of the processes of the first task information and the second task information, the object to be subjected to the processes of the first task information and the second task information, and the performance information of the storage area, and
    add to the processing times a time obtained by multiplying the time during which the processes conflict with each other, by a predetermined coefficient, thereby computing the times required for executing the first task information and the second task information.

7. The storage management computer according to claim 6,
  wherein the storage management computer is configured to predict an amount of load on the object to be subjected to the respective process, based on the acquired input/output data amount, and compute the times required for executing the first task information and the second task information.

8. The storage management computer according to claim 7,
  wherein the storage apparatus coupled to one or more second storage apparatuses via a network, is configured to use volumes of the second storage apparatuses as a storage area of the storage apparatus, and the second memory further stores a relationship between the storage area of the storage apparatus and volumes of the second storage apparatuses,
  wherein the contents of the respective process comprise a search process for recognizing path setting and an interface coupled to the network, and a process for creating a volume in the storage apparatus so that the volumes of the second storage apparatuses are capable of being used as the storage area of the storage apparatus.

9. The storage management computer according to claim 8,
  wherein the one or more task information further comprise the information on the object to be subjected to the respective process, and
  wherein the first memory is further configured to store the information on the resource used for accessing the one or more volumes.

10. The storage management computer according to claim 9,
  wherein the storage management computer is further configured to:

compute the times required for executing the processes of the first task information and the second task information, by taking the acquired contents of the configuration change as the first task information, wherein the process of the first task information is started immediately; and change a starting time so that a time for executing the process of the acquired contents of the configuration change as the first task information does not conflict with a time for executing the process of the second task information, when at least one of the processes of the first task information and the second task information is not completed by the scheduled termination time as a result of the computation of the times required for executing the first task information and the second task information.

11. The storage management computer according to claim 9, wherein the contents of the processes of the first task information and the second task information comprise either a process for migrating or copying data stored in the volume from the volume to another volume, or a process for creating a volume from the storage area.

12. A storage management method of a computer system comprising a storage apparatus coupled to a host computer via a network, and a storage management computer configured to access the storage apparatus and the host computer, the storage management method comprising the steps of:

storing, by the storage apparatus, data read or written by the host computer;

providing, by the storage apparatus, the host computer with a storage area of the storage unit as one or more volumes;

storing, in a first memory of the storage management computer, one or more task information each comprising contents of a respective process performed on the storage apparatus, and a scheduled starting time and a scheduled termination time of the respective process;

wherein the one or more task information include a first task information and a second task information, and when resources used in a process of a second task information are the same as resources used in a process of the first task information, computing, by the storage management computer, times required for executing the first task information and the second task information;

acquiring, by the storage management computer, contents of a configuration change performed on the storage apparatus;

updating, by the storage management computer, contents of at least one of the one or more task information stored in the first memory to obtain updated task information, wherein the at least one of the one or more task information is related to the configuration change;

computing, by the storage management computer, the times required for executing the processes of the first task information and the second task information by using the updated task information as the first task information;

determining that the times required for executing the processes of the first task information and the second task information conflict;

determining that at least one of the processes of the first task information and the second task information is not completed by the scheduled termination time in response to determining that the times required for executing the processes of the first task information and the second task information conflict; and switching, by the storage management computer, a task order between the process of the first task information and the process of the second task information and changing, by the storage management computer, the scheduled starting time of at least one of the process of the first task information or the process of the second task information so that a time for executing the process of the updated task information as the first task information does not conflict with a time for executing the process of the second task information in response to determining that at least one of the processes of the first task information and the second task information is not completed by the scheduled termination time, wherein the storage apparatus further comprises a second memory configured to store an input/output data amount per unit time, which is the amount of data transmitted from the host computer to the one or more volumes, wherein the storage management computer acquires the input/output data amount per unit time from the second memory of the storage apparatus, wherein the storage management computer determines whether at least part of the resources used in the processes of the first task information and the second task information are the same, on the basis of information on an object to be subjected to the respective process and information on a resource used for accessing the one or more volumes, wherein the first memory further stores performance information of the storage area, the performance information indicating Input Output Per Second (IOPS) of a certain volume, and wherein the storage management method further comprising:

computing, by the storage management computer, processing times required for executing contents of the processes of the first task information and the second task information, based on the contents of the processes of the first task information and the second task information, the object to be subjected to the processes of the first task information and the second task information, and the performance information of the storage area, and adding, by the storage management computer, to the processing times a time obtained by multiplying the time during which the processes conflict with each other, by a predetermined coefficient, thereby computing the times required for executing the first task information and the second task information.

13. The storage management method according to claim 12, further comprising the steps of:

predicting an amount of load on the object to be subjected to the respective process, based on the acquired input/output data amount; and computing the times required for executing the first task information ant the second task information.

14. The storage management method according to claim 13, wherein the storage apparatus coupled to one or more second storage apparatuses via a network, is configured to use volumes of the second storage apparatuses as a storage area of the storage apparatus, and further comprises a second memory configured to store a relationship between the storage area of the storage apparatus and the volumes of the second storage apparatuses, and wherein the contents of the respective process comprise a search process for recognizing path setting and an interface coupled to the network, and a process for creating a volume in the storage apparatus so that the volumes of the second storage apparatuses are capable of being used as the storage area of the storage apparatus.

15. The storage management method according to claim 14,
wherein the one or more task information further comprise the information on the object to be subjected to the respective process, and
wherein the information on the resource used for accessing the one or more volumes is stored in the first memory.

16. The storage management method according to claim 15, further comprising the steps of:
computing, by the storage management computer, the times required for executing the processes of the first task information and the second task information, by taking the acquired contents of the configuration change as the first task information, wherein the process of the first task information is started immediately; and
changing, by the storage management computer, a starting time so that a time for executing the process of the acquired contents of the configuration change as the first task information does not conflict with a time for executing the process of the second task information, when at least one of the processes of the first task information and the second task information is not completed by the scheduled termination time as a result of the computation of the times required for executing the first task information and the second task information.

17. The storage management method according to claim 15, further comprising the steps of:
in response to the determination that at least one of the processes of the first task information and the second task information is not completed by the scheduled termination time as a result of the computation of the times required for executing the first task information and the second task information,
changing, by the storage management computer, the scheduled starting time of at least one process of the first task information and the second task information;
re-estimating, by the storage management computer, whether each of the processes of the first task information and the second task information can be completed by the scheduled termination time;
in response to each of the processes of the first task information and the second task information can be completed by the scheduled termination time for the each process, updating, by the storage management computer, an actual starting time and an estimated termination time of the each process; and
in response to at least one process of the first task information and the second task information cannot be completed by the scheduled termination time, issuing, by the storage management computer, a warning to a user to indicate that at least one process of the first task information and the second task information cannot be completed by the scheduled termination time.

* * * * *